(12) United States Patent
Liu

(10) Patent No.: US 10,667,305 B2
(45) Date of Patent: May 26, 2020

(54) DATA TRANSMISSION METHOD AND SYSTEM

(71) Applicant: Huawei Technologies Co., Ltd., Shenzhen (CN)

(72) Inventor: Yalin Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 65 days.

(21) Appl. No.: 15/991,691

(22) Filed: May 29, 2018

(65) Prior Publication Data

US 2018/0279393 A1 Sep. 27, 2018

Related U.S. Application Data

(63) Continuation of application No. PCT/CN2016/106816, filed on Nov. 22, 2016.

(30) Foreign Application Priority Data

Nov. 30, 2015 (CN) .......................... 2015 1 0859746

(51) Int. Cl.
*H04W 76/11* (2018.01)
*H04W 4/70* (2018.01)
(Continued)

(52) U.S. Cl.
CPC ......... *H04W 76/11* (2018.02); *H04L 12/5601* (2013.01); *H04L 61/2007* (2013.01);
(Continued)

(58) Field of Classification Search
CPC ....... H04W 76/11; H04W 76/12; H04W 4/70; H04W 76/14; H04W 76/23; H04L 61/2007; H04L 12/5601; H04L 2012/5667
See application file for complete search history.

(56) References Cited

U.S. PATENT DOCUMENTS

2012/0287873 A1 11/2012 Liu et al.
2013/0201924 A1 8/2013 Song et al.
(Continued)

FOREIGN PATENT DOCUMENTS

| CN | 102076028 A | 5/2011 |
|---|---|---|
| CN | 102149214 A | 8/2011 |

(Continued)

*Primary Examiner* — Thai Nguyen
(74) *Attorney, Agent, or Firm* — Leydig, Voit & Mayer, Ltd.

(57) ABSTRACT

Disclosed are a data transmission method and system. One or more pre-setup first bearers are disposed between a first network device and a base station. One or more pre-setup second bearers are disposed between the first network device and a second network device. The transmission method includes the following steps: receiving, by the first network device by using one first bearer, data sent by the base station, where the data is sent by a terminal to the base station by using an air interface resource, and the first bearer used to receive the data is corresponding to a first service attribute of the data; and sending, by the first network device, the data to the second network device by using one second bearer, where the second bearer used to send the data is corresponding to a second service attribute of the data.

18 Claims, 14 Drawing Sheets

(51) Int. Cl.
*H04L 12/54* (2013.01)
*H04L 29/12* (2006.01)
*H04W 76/12* (2018.01)
*H04L 12/70* (2013.01)

(52) U.S. Cl.
CPC ....... *H04W 4/70* (2018.02); *H04L 2012/5667* (2013.01); *H04W 76/12* (2018.02)

(56) References Cited

U.S. PATENT DOCUMENTS

2014/0126489 A1  5/2014  Zakrzewski
2014/0254544 A1  9/2014  Kar Kin Au et al.
2015/0327327 A1* 11/2015 Jain ..................... H04W 76/38
                                                          370/328

FOREIGN PATENT DOCUMENTS

| CN | 103563440 A | 2/2014 |
| GB | 2489221 A | 9/2012 |
| WO | 2014135126 A1 | 9/2014 |
| WO | 2015036055 A1 | 3/2015 |

* cited by examiner

DATA TRANSMISSION METHOD AND SYSTEM

CROSS-REFERENCE TO RELATED APPLICATIONS

This application is a continuation of International Application No. PCT/CN2016/106816, filed on Nov. 22, 2016, which claims priority to Chinese Patent Application No. 201510859746.2, filed on Nov. 30, 2015. The disclosures of the aforementioned applications are hereby incorporated by reference in their entireties.

TECHNICAL FIELD

This patent application relates to wireless communications, and more specifically, to a data transmission method and system.

BACKGROUND

A next-generation mobile communications system supports machine-to-machine (M2M) that is also referred to as machine type communication (MTC). As predicted, a quantity of MTC devices connected to a network will reach 50 to 100 billion by 2020. This far exceeds a current connection quantity.

An enormous quantity of MTC devices exist in an M2M application. If a large quantity of MTC devices access a network and contend for network resources, new load is caused to the existing network. Currently, there is no suitable solution for these MTC devices to transmit data.

SUMMARY

In view of this, this patent application provides a data transmission method and system that are applicable to an MTC device.

According to a first aspect, this patent application provides a data transmission method. In the transmission method, there are one or more pre-setup first bearers between a first network device and a base station; and there are one or more pre-setup second bearers between the first network device and a second network device. The method includes the following steps: receiving, by the first network device by using one first bearer, data sent by the base station, where the data is sent by a terminal to the base station by using an air interface resource, and the first bearer used to receive the data is corresponding to a first service attribute of the data; and sending, by the first network device, the data to the second network device by using one second bearer, where the second bearer used to send the data is corresponding to a second service attribute of the data.

Because there are one or more pre-setup first bearers between the first network device and the base station and there are one or more pre-setup second bearers between the first network device and the second network device, the data sent by the terminal to the base station can be directly sent on the first bearer and the second bearer. This avoids a signaling process required for setting up and deleting a bearer and a delay generated therefrom, thereby effectively improving network service processing efficiency.

The first bearer is corresponding to the first service attribute of the data. The second bearer is corresponding to the second service attribute of the data. The first bearer and the second bearer are not necessarily corresponding to each terminal. In this patent application, data transmission problems of abundant terminals can be resolved by using a limited quantity of bearers. This avoids bearer signaling processes of the abundant terminals and delays generated therefrom, thereby effectively improving the network service processing efficiency.

In a first possible implementation of the first aspect, the first bearer is set up when the base station or the first network device is initialized.

With reference to the first aspect or the first possible implementation of the first aspect, in a second possible implementation, the second bearer is set up when the base station or the first network device is initialized.

The first bearer and the second bearer are set up during initialization. When an attach is performed, the terminal may directly use the first bearer and the second bearer that are set up, thereby further improving the network service processing efficiency.

With reference to the first aspect or the first possible implementation of the first aspect, in a third possible implementation, the second network device is a server, and the second bearer is set up when the server is initialized. In this case, various application services can be provided for a user by using the Internet, so that the network can support an OTT (over the top) service capability. Especially, when a future network supports network slicing, a vertical service capability can be provided.

With reference to the first aspect or the first to the third possible implementations of the first aspect, in a fourth possible implementation, the first service attribute is an attribute of an air interface resource, and the first bearer used to receive the data is corresponding to an attribute of the air interface resource used by the data. Selecting the corresponding first bearer by using the attribute of the air interface resource used by the data can simplify a data processing process.

With reference to the first aspect or the first to the third possible implementations of the first aspect, in a fifth possible implementation, the first service attribute is a first service quality characteristic, and the first bearer used to receive the data is corresponding to a first service quality characteristic of the data. Selecting the corresponding first bearer by using the first service quality characteristic of the data can simplify a data processing process.

With reference to the first aspect or the first to the fifth possible implementations of the first aspect, in a sixth possible implementation, the second service attribute is a second service quality characteristic, and the method further includes: determining, by the first network device by using a second service quality characteristic of the data, the second bearer used to send the data. Selecting the corresponding second bearer by using the second service quality characteristic of the data can simplify the data processing process.

With reference to the first aspect or the first to the sixth possible implementations of the first aspect, in a seventh possible implementation, the data received by using the first bearer carries a first identifier of the terminal; the first network device obtains an IP address of the terminal according to a correspondence between the first identifier of the terminal and the IP address of the terminal; and the data sent by the first network device to the second network device carries the IP address of the terminal. The first identifier enables the base station and the first network device to accurately distinguish each terminal in management domains of the base station and the first network device. In this way, it is possible that no IP address needs to be carried during the data transmission on the first bearer and an air interface.

With reference to the seventh possible implementation of the first aspect, in an eighth possible implementation, a bit quantity of the first identifier is less than a bit quantity of the IP address. In this way, the terminal can be identified on the air interface and the first bearer by using only the first identifier, so as to reduce air interface overheads.

With reference to the first to the eighth possible implementations of the first aspect, in a ninth possible implementation, the method further includes: after detecting a suspected terminal by using data, sending, by the first network device, a security request to the base station; and receiving, by the first network device, a security response sent by the base station. This security mechanism can avoid system congestion caused by continuous message sending by some malicious terminals.

With reference to the first to the eighth possible implementations of the first aspect, in a tenth possible implementation, the first network device includes a first network device user plane and a first network device control plane, and the first network device is specifically the first network device user plane. By using an architecture with a user plane and a control plane separated, data processing is performed only by the user plane. This further simplifies network processing, thereby improving network processing efficiency.

According to a second aspect, this patent application provides a first network device, where there are one or more pre-setup first bearers between the first network device and a base station; and there are one or more pre-setup second bearers between the first network device and a second network device. The first network device includes a first receiver and a first transmitter. The first receiver receives, by using one first bearer, data sent by the base station, where the data is sent by a terminal to the base station by using an air interface resource, and the first bearer used to receive the data is corresponding to a first service attribute of the data. The first transmitter sends the data to the second network device by using one second bearer, where the second bearer used to send the data is corresponding to a second service attribute of the data.

In a first possible implementation of the second aspect, the first bearer and the second bearer are set up when the first network device is initialized.

With reference to the second aspect or the first possible implementation of the second aspect, in a second possible implementation, the first service attribute is an attribute of an air interface resource, and the first bearer used to receive the data is corresponding to an attribute of the air interface resource used by the data.

With reference to the second aspect or the first possible implementation of the second aspect, in a third possible implementation, the first service attribute is a first service quality characteristic, and the first bearer used to receive the data is corresponding to a first service quality characteristic of the data.

With reference to the second aspect and the first to the third possible implementations of the second aspect, in a fourth possible implementation, the second service attribute is a second service quality characteristic, the first network device further includes a first processor, and the first processor determines, by using a second service quality characteristic of the data, the second bearer used to send the data.

With reference to the second aspect and the first to the fourth possible implementations of the second aspect, in a fifth possible implementation, the data received by using the first bearer carries a first identifier of the terminal; the first processor further obtains an IP address of the terminal according to a correspondence between the first identifier of the terminal and the IP address of the terminal; and the data sent by the first transmitter to the second network device carries the IP address of the terminal.

With reference to the fifth possible implementation of the second aspect, in a sixth possible implementation, a bit quantity of the first identifier is less than a bit quantity of the IP address.

With reference to the fifth or the sixth possible implementation of the second aspect, in a seventh possible implementation, the first processor is further configured to detect a suspected terminal; and the first transmitter is further configured to send a security request to the base station after the first processor detects a suspected terminal, and the first receiver is further configured to receive a security response sent by the base station.

According to a third aspect, this patent application provides a data transmission method, where there are one or more pre-setup first bearers between a first network device and a base station. The method includes the following steps: receiving, by the base station from an air interface resource, data sent by a terminal; and sending, by the base station, the data to the first network device by using one first bearer, where the first bearer used to send the data is corresponding to a first service attribute of the data.

In a first possible implementation of the third aspect, the first bearer is set up when the base station or the first network device is initialized.

With reference to the third aspect or the first possible implementation of the third aspect, in a second possible implementation, the first service attribute is an attribute of an air interface resource, and the method further includes: selecting, by the base station, the corresponding first bearer by using an attribute of the air interface resource of the data.

With reference to the third aspect or the first possible implementation of the third aspect, in a third possible implementation, the first service attribute is a first service quality characteristic, and the method further includes: selecting, by the base station, the corresponding first bearer by using a first service quality characteristic of the data.

With reference to the third aspect or the first to the third possible implementations of the third aspect, in a fourth possible implementation, the method further includes: receiving, by the base station, a security request sent by the first network device, where the security request carries an identity identifier of a suspected terminal; performing, by the base station, security processing on the suspected terminal; and sending, by the base station, a security response to the first network device, where the security response carries the identity identifier of the terminal on which security processing is performed.

According to a fourth aspect, this patent application provides a base station, where there are one or more pre-setup first bearers between a first network device and the base station. The base station includes a second receiver and a second transmitter. The second receiver receives, from an air interface resource, data sent by a terminal; and the second transmitter sends the data to the first network device by using one first bearer, where the first bearer used to send the data is corresponding to a first service attribute of the data.

In a first possible implementation of the fourth aspect, the first bearer is set up when the base station or the first network device is initialized.

With reference to the fourth aspect or the first possible implementation of the fourth aspect, in a second possible implementation, the first service attribute is an attribute of an air interface resource, and the base station further includes a second processor, configured to select the corresponding first bearer by using an attribute of the air interface resource of the data.

With reference to the fourth aspect or the first possible implementation of the fourth aspect, in a third possible implementation, the first service attribute is a first service quality characteristic, and the base station further includes a second processor, configured to select the corresponding first bearer by using a first service quality characteristic of the data.

With reference to the second and the third possible implementations of the fourth aspect, in a fourth possible implementation, the second receiver further receives a security request sent by the first network device, where the security request carries an identity identifier of a suspected terminal; the second processor performs security processing on the suspected terminal; and the second transmitter sends a security response to the first network device, where the security response carries the identity identifier of the terminal on which security processing is performed.

According to a fifth aspect, this patent application provides a data transmission method, where there are one or more pre-setup first bearers between a first network device and a base station; and there are one or more pre-setup second bearers between the first network device and a second network device. The method includes the following steps: receiving, by the first network device by using one second bearer, data sent by the second network device, where the second bearer used to receive the data is corresponding to a second service attribute of the data; and sending, by the first network device, the data to the base station by using one first bearer, where the first bearer used to send the data is corresponding to a first service attribute of the data.

In a first possible implementation of the fifth aspect, the first bearer is set up when the base station or the first network device is initialized.

With reference to the fifth aspect or the first possible implementation of the fifth aspect, in a second possible implementation, the second bearer is set up when the base station or the first network device is initialized.

With reference to the fifth aspect or the first possible implementation of the fifth aspect, in a third possible implementation, the second network device is a server, and the second bearer is set up when the server is initialized.

With reference to the fifth aspect or the first to the third possible implementations of the fifth aspect, in a fourth possible implementation, the first service attribute is an attribute of an air interface resource, and the first network device determines, by using an attribute of the air interface resource of the data, the first bearer used to send the data.

With reference to the fifth aspect or the first to the third possible implementations of the fifth aspect, in a fifth possible implementation, the first service attribute is a first service quality characteristic, and the first network device determines, by using a first service quality characteristic of the data, the first bearer used to send the data.

With reference to the fifth aspect or the first to the fifth possible implementations of the fifth aspect, in a sixth possible implementation, the second service attribute is a second service quality characteristic, and the second bearer used to receive the data is corresponding to a second service quality characteristic of the data.

With reference to the fifth aspect or the first to the sixth possible implementations of the fifth aspect, in a seventh possible implementation, the data received by using the second bearer carries an IP address of the terminal; the first network device obtains a first identifier of the terminal according to a correspondence between the IP address of the terminal and the first identifier of the terminal; and the data sent by the first network device to the second network device carries the first identifier of the terminal. A bit quantity of the first identifier is less than a bit quantity of the IP address.

According to a sixth aspect, this patent application provides a first network device, where there are one or more pre-setup first bearers between the first network device and a base station; and there are one or more pre-setup second bearers between the first network device and a second network device. The first network device includes a first receiver and a first transmitter. The first receiver receives, by using one second bearer, data sent by the second network device. The second bearer used to receive the data is corresponding to a second service attribute of the data. The first transmitter sends the data to the base station by using one first bearer, where the first bearer used to send the data is corresponding to a first service attribute of the data.

In a first possible implementation of the sixth aspect, the first bearer and the second bearer are set up when the first network device is initialized.

With reference to the sixth aspect or the first possible implementation of the sixth aspect, in a third possible implementation, the first service attribute is an attribute of an air interface resource, the first network device further includes a first processor, and the first processor determines, by using an attribute of the air interface resource of the data, the first bearer used to send the data.

With reference to the sixth aspect or the first possible implementation of the sixth aspect, in a fourth possible implementation, the first service attribute is a first service quality characteristic, the first network device further includes a first processor, and the first processor determines, by using a first service quality characteristic of the data, the first bearer used to send the data.

With reference to the sixth aspect or the first to the fourth possible implementations of the sixth aspect, in a fifth possible implementation, the second service attribute is a second service quality characteristic, and the first bearer used to receive the data is corresponding to a second service quality characteristic of the data.

With reference to the third and the fourth possible implementations of the sixth aspect, in a sixth possible implementation, the data received by using the second bearer carries an IP address of the terminal; a second processor obtains a first identifier of the terminal according to a correspondence between the IP address of the terminal and the first identifier of the terminal; and the data sent by a second transmitter to the second network device carries the first identifier of the terminal. A bit quantity of the first identifier is less than a bit quantity of the IP address.

According to a seventh aspect, this patent application provides a data transmission method, where there are one or more pre-setup first bearers between a first network device and a base station. The method includes the following steps: receiving, by the base station by using one first bearer, data sent by the first network device, where the first bearer used to receive the data is corresponding to a first service attribute of the data; and sending, by the base station, the data to a terminal by using an air interface resource.

In a first possible implementation of the seventh aspect, the first bearer is set up when the base station or the first network device is initialized.

With reference to the seventh aspect or the first possible implementation of the seventh aspect, in a second possible implementation, the first service attribute is an attribute of an air interface resource, and the first bearer used to receive the data is corresponding to an attribute of the air interface resource of the data.

With reference to the seventh aspect or the first possible implementation of the seventh aspect, in a third possible implementation, the first service attribute is a first service quality characteristic, and the first bearer used to receive the data is corresponding to a first service quality characteristic of the data.

According to an eighth aspect, this patent application provides a base station, where there are one or more pre-setup first bearers between a first network device and the base station. The base station includes a second receiver and a second transmitter. The second receiver receives, by using one first bearer, data sent by the first network device. The first bearer used to receive the data is corresponding to a first service attribute of the data. The second transmitter sends the data to a terminal by using an air interface resource.

In a first possible implementation of the eighth aspect, the first bearer is set up when the base station is initialized.

With reference to the eighth aspect or the first possible implementation of the eighth aspect, in a second possible implementation, the first service attribute is an attribute of an air interface resource, and the first bearer used to receive the data is corresponding to an attribute of the air interface resource of the data.

With reference to the eighth aspect or the first possible implementation of the eighth aspect, in a third possible implementation, the first service attribute is a first service quality characteristic, and the first bearer used to receive the data is corresponding to a first service quality characteristic of the data.

According to a ninth aspect, this patent application proposes a bearer setup method, including: when a first network device is initialized, sending, by the first network device, a first bearer setup request to a base station, where the first bearer setup request carries identification information of the first network device and first bearer information whose creation is requested; receiving, by the first network device, a first bearer setup response sent by the base station, where the first bearer setup response carries first bearer information allocated by the base station; sending, by the first network device, a second bearer setup request to a second network device, where the second bearer setup request carries the identification information of the first network device and second bearer information whose creation is requested; and receiving, by the first network device, a second bearer setup response sent by the second network device, where the second bearer setup response carries identification information of a second bearer and created second bearer information.

In a first possible implementation of the ninth aspect, the method further includes: sending, by the first network device, a second bearer modification request to the second network device, where the second bearer modification request carries a requested modified second bearer bandwidth; and receiving, by the first network device, a second bearer modification response sent by the second network device, where the second bearer modification response carries a modified bandwidth allocated to a second bearer.

With reference to the ninth aspect or the first possible implementation of the ninth aspect, in a second possible implementation, the method further includes: sending, by the first network device, first bearer setup completion information to the base station, where the first bearer setup completion information carries identification information of a first bearer whose setup is completed, the identification information of the first network device, and identification information of the base station.

With reference to the ninth aspect or the first and the second possible implementations of the ninth aspect, in a third possible implementation, the first network device includes a first network device user plane and a first network device control plane, the first network device is specifically the first network device control plane, and the method further includes: sending, by the first network device control plane, a first bearer setup request to the first network device user plane, where the first bearer setup request carries an identifier of the base station and first bearer information allocated by the base station; receiving, by the first network device control plane, a first bearer setup response sent by the first network device user plane, where the first bearer setup response carries an identifier of the first network device user plane, the identifier of the base station, and first bearer information allocated by the first network device user plane; and sending, by the first network device control plane, a first bearer setup completion message to the first network device user plane, where the first bearer setup completion message carries the identifier of the base station and first bearer information whose creation is completed.

With reference to the third possible implementation of the ninth aspect, in a fourth possible implementation, the method further includes: sending, by the first network device control plane, a second bearer setup request to the first network device user plane, where the second bearer setup request carries an identifier of the first network device control plane and the identifier of the first network device user plane; receiving, by the first network device control plane, a second bearer setup response sent by the first network device user plane, where the second bearer setup response carries the identifier of the first network device user plane and second bearer information allocated by the first network device user plane; and sending, by the first network device control plane, a second bearer setup completion message to the first network device user plane, where the second bearer setup response carries second bearer information whose creation is completed.

According to a tenth aspect, this patent application proposes a first network device, including a processor and a memory that are mutually coupled, where the memory stores an instruction, and the processor executes the instruction to complete the bearer setup method according to the ninth aspect.

According to an eleventh aspect, this patent application proposes a bearer setup method, including: receiving, by a base station, a first bearer setup request sent by a first network device, where the first bearer setup request carries identification information of the first network device and first bearer information whose creation is requested; and sending, by the base station, a first bearer setup response to the first network device, where the first bearer setup response carries first bearer information allocated by the base station.

In a first possible implementation of the eleventh aspect, the method further includes: receiving, by the base station, first bearer setup completion information sent by the first network device, where the first bearer setup completion information carries an identifier of a created first bearer.

According to a twelfth aspect, this patent application proposes a base station, including a processor and a memory that are mutually coupled, where the memory stores an instruction, and the processor executes the instruction to complete the bearer setup method according to the eleventh aspect.

According to a thirteenth aspect, this patent application proposes a bearer setup method, including: when a base station is initialized, receiving, by a first network device, a first bearer setup request sent by the base station, where the first bearer setup request carries identification information of the base station and first bearer information whose creation is requested; and sending, by the first network device, a first bearer setup response to the base station, where the first bearer setup response carries created first bearer information.

In a first possible implementation of the thirteenth aspect, the method further includes: sending, by the first network device, a second bearer setup request to a gateway, where the second bearer setup request carries identification information of the first network device and second bearer information whose creation is requested; and receiving, by the first network device, a second bearer setup response sent by the gateway, where the second bearer setup response carries identification information of a second bearer and created second bearer information.

In a second possible implementation of the thirteenth aspect, the method further includes: sending, by the first network device, a second bearer modification request to the gateway, where the second bearer modification request carries a requested bandwidth; and receiving, by the first network device, a second bearer modification response sent by the gateway, where the second bearer modification response carries identification information of a second bearer and a modified bandwidth allocated to the second bearer.

According to a fourteenth aspect, this patent application proposes a first network device, including a processor and a memory that are mutually coupled, where the memory stores an instruction, and the processor executes the instruction to complete the bearer setup method according to the thirteenth aspect.

According to a fifteenth aspect, this patent application proposes a bearer setup method, including: when a base station is initialized, sending, by the base station, a first bearer setup request to a first network device, where the first bearer setup request carries identification information of the base station and first bearer information whose creation is requested; and receiving, by the base station, a first bearer setup response sent by the first network device, where the first bearer setup response carries first bearer information allocated by the first network device.

In a first possible implementation of the fifteenth aspect, the method further includes: receiving, by the base station, first bearer setup completion information sent by the first network device, where the first bearer setup completion information carries an identifier of a created first bearer.

According to a sixteenth aspect, this patent application proposes a base station, including a processor and a memory that are mutually coupled, where the memory stores an instruction, and the processor executes the instruction to complete the bearer setup method according to the fifteenth aspect.

According to a seventeenth aspect, this patent application proposes a method for attach of a terminal to a network, where the method includes: receiving, by a base station, an attach request sent by the terminal; sending, by the base station, the attach request to a first network device, so that the first network device allocates a first identifier to the terminal; receiving, by the base station, an attach response sent by the first network device; and sending, by the base station, the attach response to the terminal, where the attach response carries the first identifier of the terminal.

In a first possible implementation of the seventeenth aspect, the attach response further carries an IP address of the terminal, where there is a correspondence between the first identifier of the terminal and the IP address of the terminal; and a bit quantity of the first identifier of the terminal is less than a bit quantity of the IP address of the terminal.

According to an eighteenth aspect, this patent application proposes a base station, including a processor and a memory that are mutually coupled, where the memory stores an instruction, and the processor executes the instruction to complete the method for attach according to the seventeenth aspect.

According to a nineteenth aspect, this patent application proposes a method for attach of a terminal to a network, where the method includes: receiving, by a first network device, an attach request sent by a base station, where the attach request is sent by the terminal to the base station; allocating, by the first network device, a first identifier to the terminal; and sending, by the first network device, an attach response to the base station, so that the base station sends the attach response to the terminal, where the attach response carries the first identifier of the terminal.

In a first possible implementation of the nineteenth aspect, the attach response further carries an IP address of the terminal that is obtained by the first network device from a gateway, the attach response further carries the IP address of the terminal, and there is a correspondence between the first identifier of the terminal and the IP address of the terminal.

With reference to the first possible implementation of the nineteenth aspect, in a second possible implementation, the method further includes: setting up, by the first network device, the correspondence between the first identifier of the terminal and the IP address of the terminal.

According to a twentieth aspect, this patent application proposes a first network device, including a processor and a memory that are mutually coupled, where the memory stores an instruction, and the processor executes the instruction to complete the method for attach according to the nineteenth aspect.

According to a twenty-first aspect, this patent application proposes a method for attach of a terminal to a network, where the method includes: sending, by the terminal, an attach request to a base station; and receiving, by the terminal, an attach response sent by the base station, where the attach response carries a first identifier of the terminal.

In a first possible implementation of the twenty-first aspect, the first identifier is allocated by a first network device, and there is a correspondence between the first identifier of the terminal and an IP address of the terminal.

According to a twenty-second aspect, this patent application proposes a terminal, including a processor and a memory that are mutually coupled, where the memory stores an instruction, and the processor executes the instruction to complete the method for attach according to the twenty-first aspect.

In this patent application, the first bearer and the second bearer used in data transmission are set up in advance. After the data transmission is completed, the first bearer and the second bearer continue to be retained for use in next transmission. The first bearer and the second bearer are not deleted after one data transmission is completed. The first bearer and the second bearer only need to be set up once. The first bearer and the second bearer are set up according to a service attribute, and are not related to a quantity of terminals. Both a quantity of first bearers and a quantity of second bearers are less than a quantity of terminals managed by the bases station. Data transmission problems of abundant terminals can be resolved by using a limited quantity of bearers. This avoids bearer signaling processes and delays generated therefrom, thereby effectively improving network service processing efficiency.

BRIEF DESCRIPTION OF DRAWINGS

To describe the technical solutions in the embodiments of this patent application more clearly, the following briefly describes the accompanying drawings required for describing the embodiments of this patent application. Apparently, the accompanying drawings in the following description show merely some embodiments of this patent application, and a person of ordinary skill in the art may still derive other drawings from these accompanying drawings without creative efforts.

DESCRIPTION OF EMBODIMENTS

Figure 1:
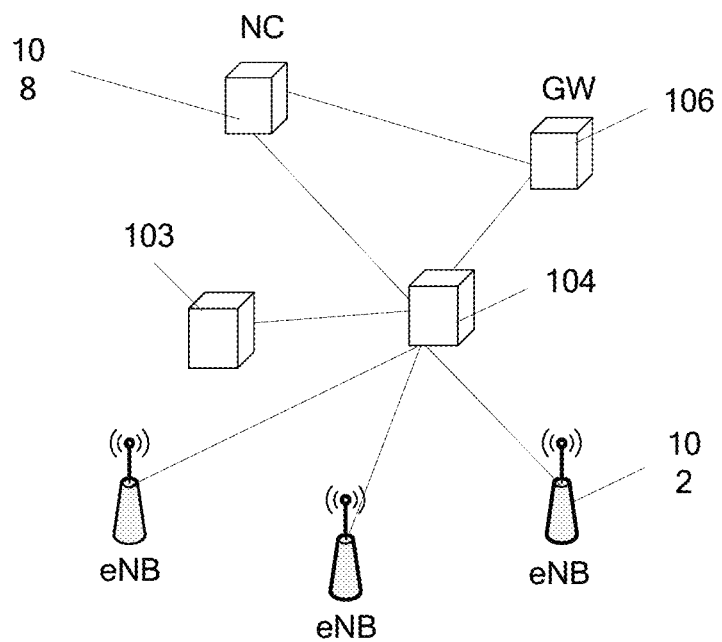
FIG. 1 is a schematic diagram of a network system architecture according to an embodiment of this patent application.

The following clearly describes the technical solutions in the embodiments of this patent application with reference to the accompanying drawings in the embodiments of this patent application. Apparently, the described embodiments are merely some but not all of the embodiments of this patent application. All other embodiments obtained by a person of ordinary skill in the art based on the embodiments of this patent application without creative efforts shall fall within the protection scope of this patent application.

In this patent application, the term such as "first" is intended to distinguish between similar objects, and "first" particularly indicates only one or one type of object, but does not necessarily indicate a specific order or sequence. It should be understood that the terms used in such a way are interchangeable in proper circumstances, which is merely a discrimination manner that is used when objects having a same attribute are described in the embodiments of this patent application. "A" or "an" does not exclude a plurality. In addition, the terms "include", "contain" and any other variants mean to cover the non-exclusive inclusion, so that a process, method, system, product, or device that includes a series of units is not necessarily limited to those units, but may include other units not expressly listed or inherent to such a process, method, system, product, or device.

A terminal in this patent application may include various handheld devices, in-vehicle devices, wearable devices, and computing devices that have a radio communication function, another processing device connected to a wireless modem, and a user equipment (UE) in various forms, including a mobile station (MS), terminal equipment, and the like. For ease of description, in this patent application, the devices mentioned above are collectively referred to as a terminal or a UE.

A base station (BS) in this patent application is an apparatus that is deployed in a radio access network and that is configured to provide a wireless communication function for a UE. The base station may include a macro base station, a micro base station, a relay node, an access point, and the like that are in various forms. In systems that use different radio access technologies, names of devices that have a base station function may be different. For example, in an LTE network, a device having the base station function is referred to as an evolved NodeB (eNB or eNodeB), and in a 3rd Generation (3G) network, the device is referred to as a NodeB (Node B), or the like. For ease of description, in this patent application, the foregoing apparatuses that provide the wireless communication function for a UE are collectively referred to as a base station or a BS.

A gateway in this patent application may include a serving gateway (S-GW), a Packet Data Network gateway (P-GW), or another network node that has a gateway function.

Grant-free transmission may be understood as any meaning, multiple meanings, a combination of some technical features in multiple meanings, or another similar meaning in the following meanings:

The grant-free transmission may be a method in which uplink data transmission of a terminal can be implemented without requiring dynamic scheduling performed by a wireless controller in a first network device or cloud/centralized radio access network (CRAN) scenario in a public land mobile network (PLMN). The dynamic scheduling is that a network assigns, by using signaling and for uplink transmission performed by a UE each time, a transmission resource required after a subsequent transmission time interval (TTI) of a current signaling receive moment. The transmission time interval is a minimum time unit for one uplink transmission, for example, 1 ms.

The grant-free transmission may be a manner in which a terminal transmits data on a designated time-frequency resource according to different characteristics of transmitted data such as a transmission delay or reliability requirement by using a code resource, a pilot resource, a modulation and coding scheme, a feedback class, a diversity manner, and the like that can be supported by the time-frequency resource, so as to reduce network signaling and/or a transmission delay.

The grant-free transmission may be: A first network device pre-allocates and notifies multiple transmission resources to a terminal device; when the terminal device needs to transmit uplink data, the terminal device selects at least one transmission resource from the multiple transmission resources pre-allocated by the first network device, and sends the uplink data by using the selected transmission resource; and the first network device detects, on a transmission resource in the multiple pre-allocated transmission resources, the uplink data sent by the terminal device. The detection may be blind detection, or may be detection performed according to a control domain in the uplink data, or may be detection performed in another manner.

The grant-free transmission may be: A first network device pre-allocates and notifies multiple transmission resources to a terminal device, so that when the terminal device needs to transmit uplink data, the terminal device selects at least one transmission resource from the multiple transmission resources pre-allocated by the first network device, and sends the uplink data by using the selected transmission resource.

The grant-free transmission may be: obtaining information about multiple pre-allocated transmission resources; and when uplink data needs to be transmitted, selecting at least one transmission resource from the multiple transmission resources, and sending the uplink data by using the selected transmission resource. An obtaining manner may be obtaining the information from a first network device.

The grant-free transmission may be a method in which uplink data transmission of a terminal device can be implemented without requiring dynamic scheduling performed by a first network device. The dynamic scheduling may be a scheduling manner in which the first network device indicates, by using signaling, a transmission resource for uplink data transmission performed by the terminal device each time. Optionally, implementing the uplink data transmission of the terminal device may be understood as allowing two or more terminal devices to perform uplink data transmission on a same time-frequency resource. Optionally, the transmission resource may be a transmission resource required for a transmission time unit after a moment at which a UE receives the signaling. One transmission time unit may be a minimum time unit for one transmission, for example, a TTI (Transmission Time Interval), and a value may be 1 ms; or one transmission time unit may be a preset transmission time unit.

The grant-free transmission may be: A terminal device performs uplink data transmission without requiring a grant from a first network device. The grant may be an uplink grant sent by the first network device to the terminal device after the first network device receives an uplink scheduling request sent by the terminal device. The uplink grant indicates an uplink transmission resource allocated to the terminal device.

The grant-free transmission may be a contention transmission manner, and may be specifically: Multiple terminals simultaneously perform uplink data transmission on a same pre-allocated time-frequency resource without requiring a grant from a base station.

The blind detection may be understood as detection performed, when it is not foreknown whether data is to arrive, on data that possibly arrives. Alternatively, the blind detection may be understood as detection performed without an explicit signaling indication.

The air interface resource may be a resource used by a terminal to perform transmission on an air interface.

The first network device is a network-side communications device that performs data transmission with a base station. The first network device further processes the data.

The transmission resource may include but is not limited to one or a combination of following resources:

time domain resources, such as a radio frame, a subframe, and a symbol;

frequency domain resources, such as a subcarrier and a resource block;

space domain resources, such as a transmit antenna and a beam;

code domain resources, such as a sparse code multiple access (SCMA) codebook, a low density signature (LDS) sequence, and a CDMA code; and uplink pilot resources.

The foregoing transmission resource may be used to perform transmission according to control mechanisms including but not limited to the following:

uplink power control, such as uplink transmit power upper limit control;

modulation and coding scheme settings, such as settings of a transport block size, a bit rate, and a modulation order; and retransmission mechanism, such as an HARQ mechanism.

The first network device is a communications device that receives grant-free transmitted data from a base station or sends grant-free transmitted data to a base station and that processes the grant-free transmitted data, and a contention transmission unit (CTU) may be a basic transmission resource for grant-free transmission. The CTU may be a transmission resource combining time, a frequency, and a code domain, or a transmission resource combining time, a frequency, and a pilot, or a transmission resource combining time, a frequency, a code domain, and a pilot.

An access area of the CTU may be a time-frequency area for grant-free transmission, or may further be a time-frequency area corresponding to the CTU.

Network entity titles in all embodiments of this patent may be extended into titles with same or similar functions.

In this patent application, each step is marked with a reference sign in description of methods. However, this does not indicate that steps need to be performed according to a sequence of reference signs. A person skilled in the art may adjust a sequence of steps without creative efforts.

A patent application of Patent Application No. PCT/CN2014/073084 and entitled "System and Method for Uplink Grant-free Transmission Scheme" provides an uplink grant-free transmission technical solution. In this patent application, a radio resource is divided into contention transmission units (CTU) of different sizes, and a terminal device is mapped to a CTU. A group of codes are allocated to each CTU, an allocated code may be a Code Division Multiple Access (CDMA) code, or may be sparse code multiple access (SCMA), a low density signature (LDS), a signature, or the like. Each code is corresponding to a group of pilots. A terminal may select one code and one pilot in a group of pilots corresponding to the code to perform uplink transmission.

It may be understood that patent application content of PCT/CN2014/073084 may be used as a part of content in the embodiments of this patent application by reference, and details are not described. PCT/CN2014/073084 is mainly targeted for air interface transmission, but does not describe processing on a network side. This patent application can implement processing on the network side, and improve network service processing efficiency.

In an LTE system, a default bearer from a P-GW to an S-GW is set up for each UE, so that the UE is maintained online permanently. When the UE requests for service transmission, a mobility management entity (MME) sends an initial context setup request to an eNB (enhanced NodeB), so as to set up a bearer from the eNB to the S-GW and that to an air interface.

A quantity of future MTC services is enormous, and therefore a quantity of terminals accessing one base station may be 300,000 or more. Some MTC terminals may transmit data at a low frequency by using a small data packet. Because the transmission frequency is low, the MTC terminal enters an idle state after performing one transmission. When performing a next transmission, the MTC terminal needs to perform the transmission by means of a random access process. Because a large quantity of terminals exist, a system generates a large quantity of random access processes, and enormous system resources are consumed, particularly, a large quantity of signaling resources are occupied. This may affect another normal massive data transmission service.

Some MTC services have a relatively high delay requirement, for example, a service of the Internet of Vehicles. If transmission is performed by means of a conventional scheduling request process, a great delay is caused, and a service requirement cannot be met.

When a quantity of UEs in a future network system significantly increases, setting up a default bearer for each UE consumes enormous system resources and even causes context resource insufficiency on a P-GW. In addition, each time a UE performs transmission, a bearer from an air interface to an S-GW and a bearer from a base station to the S-GW need be to set up for the UE. This consumes enormous system signaling resources and increases system load.

With these problems learned, a data transmission method and system in this patent application are proposed.

The following first describes an architecture in an embodiment of this patent application. FIG. 1 is a schematic diagram of a network system architecture according to an embodiment of this patent application. As shown in FIG. 1, a network system includes a first network device 104, a gateway (GW) 106, a network controller (NC) 108, and multiple base stations (Evolved Node B or eNB) 102. Each base station 102 manages a large quantity of terminals served by the base station 102.

In this embodiment, the first network device 104 is a centralized architecture, and the first network device 104 can be responsible for both processing on a control plane and processing on a user plane, for example, data transmission.

The first network device 104 may be connected to multiple base stations 102, and serve terminals served by the multiple base stations 102. The first network device 104 may further be connected to the network controller 108, and the first network device may obtain terminal information from the network controller, for example, policy control information. The network controller 108 may include a mobility management entity (MME), a policy and charging rules function (PCRF), or a home subscriber server (HSS).

The first network device 104 may further be connected to the gateway 106. The first network device has an ID that uniquely identifies the first network device, and the ID may be an IP address of the first network device.

A network in this embodiment of this patent application may be a public land mobile network (PLMN), a device-to-device (D2D) network, an M2M network, or another network. FIG. 1 is only a simplified schematic diagram used as an example. The network may further include another first network device, and this is not shown in FIG. 1.

The first network device 104 may be a physical entity, or may be a functional entity. When the first network device 104 is a functional entity, the first network device 104 may be physically deployed with a network controller, an S-GW, or another network device.

There are one or more pre-setup first bearers between the first network device and the base station. There are one or more pre-setup second bearers between the first network device and a second network device.

Figure 2:
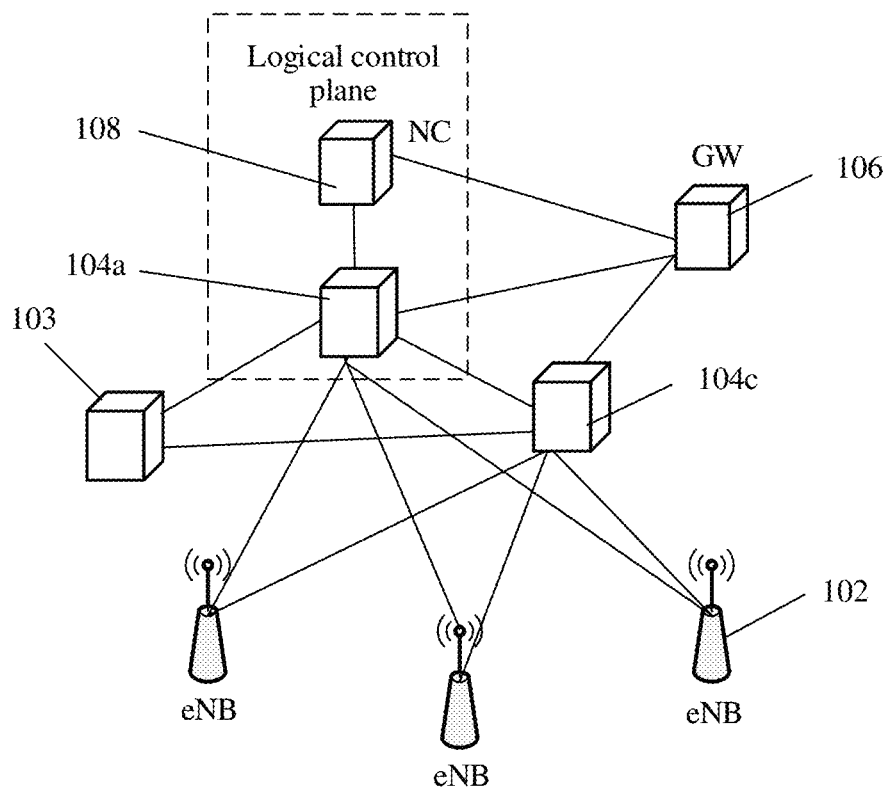
FIG. 2 is a schematic diagram of a network system architecture according to another embodiment of this patent application.

FIG. 2 is a schematic diagram of a network system architecture according to another embodiment of this patent application. In this embodiment, a network uses a control plane/user plane (C/U) separated architecture. The control plane performs control in a centralized manner, and the user plane completes data forwarding. As shown in FIG. 2, a network system includes a first network device, a gateway 106, a network controller 108, and multiple base stations 102. The first network device is a separated architecture, and the first network device includes a first network device control plane 104a and a first network device user plane 104c.

The first network device control plane 104a and the first network device user plane 104c may be separately connected to multiple base stations. In the first network device separated architecture, one first network device control plane can be connected to the first network device user plane, and different first network device user planes may support multiple services, or may separately support different service categories. For example, one first network device user plane supports a low-delay high-reliability service, and another first network device user plane supports a delay-tolerable reliable transmission service.

Figure 3:
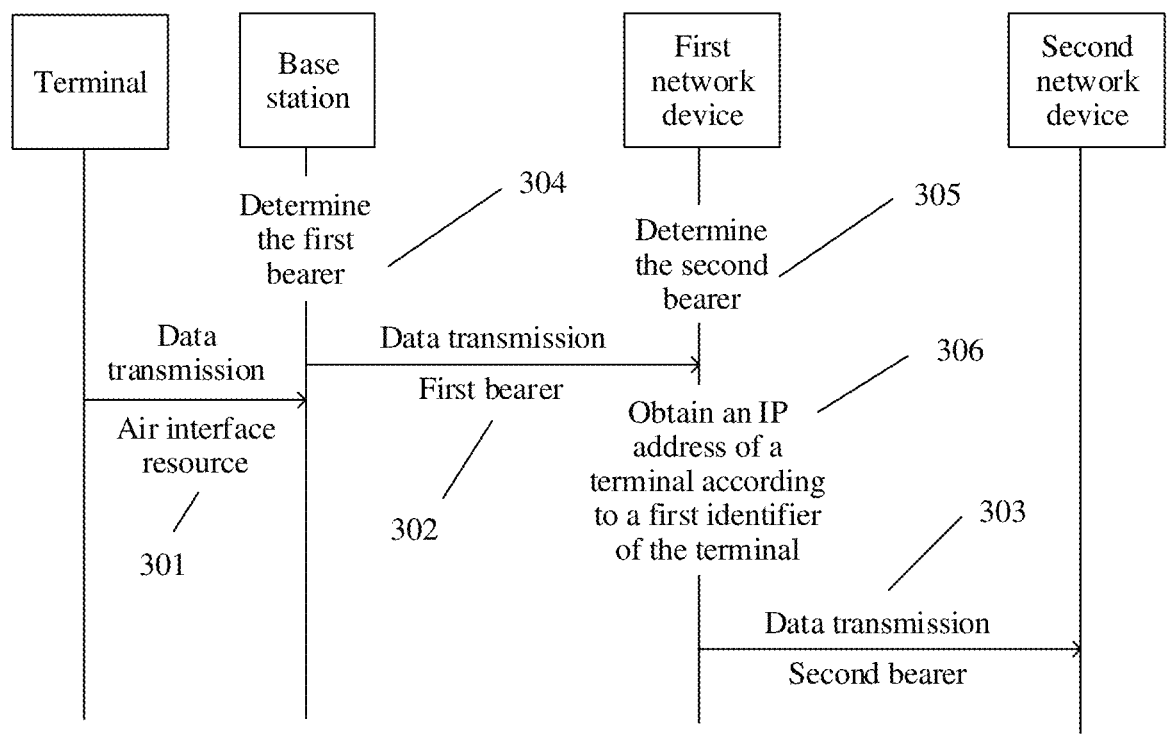
FIG. 3 is a schematic diagram of an uplink data transmission method of a machine type according to an embodiment of this patent application.
Figure 4:
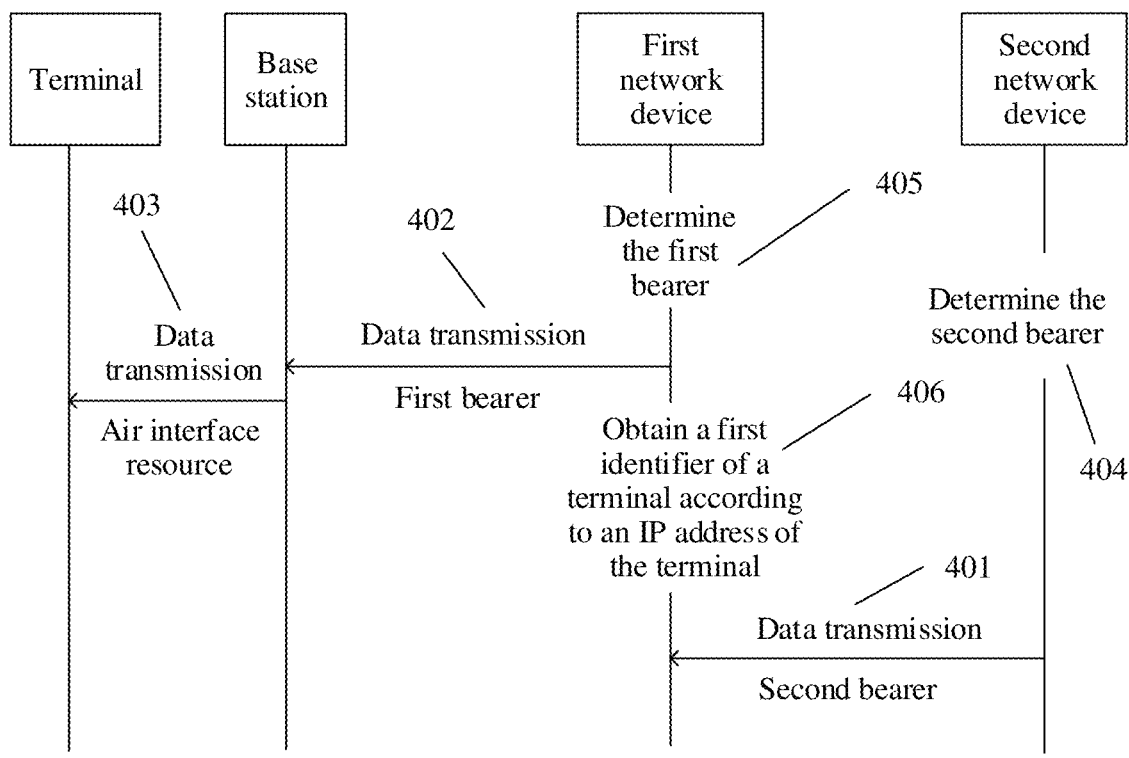
FIG. 4 is a schematic diagram of a downlink data transmission method of a machine type according to another embodiment of this patent application.

Referring to FIG. 3 and FIG. 4, FIG. 3 is a schematic diagram of a data transmission method for performing uplink data transmission according to an embodiment of this patent application. FIG. 4 is a schematic diagram of a data transmission method for performing data transmission according to another embodiment of this patent application. The uplink data transmission and downlink data transmission may be separately performed, or may be simultaneously performed. In description about FIG. 3 and FIG. 4, the first network device may be a first network device in a first network device centralized architecture, or may be a first network device user plane in a first network device separated architecture.

As shown in FIG. 3, in the data transmission method, an application scenario of the transmission method includes: there are one or more pre-setup first bearers between the first network device and a base station; and there are one or more pre-setup second bearers between the first network device and a second network device.

The transmission method includes the following steps.

Step 301: A terminal sends data to the base station by using an air interface resource, and the base station receives, on the air interface resource, the data sent by the terminal.

Step 302: The base station sends the data to the first network device by using one first bearer, and the first network device receives the data sent by the base station.

Step 303: The first network device sends the data to the second network device by using one second bearer.

The first bearer and the second bearer are set up in advance, and are not released after one data transmission is completed. After the data transmission is completed, the first bearer and the second bearer continue to be retained for use during next data transmission. The first bearer and the second bearer do not need to be constantly created or deleted according to a change of a terminal state or completion of one data transmission. The first bearer and the second bearer only need to be set up once. This avoids a signaling process required for setting up and deleting a bearer and a delay generated therefrom, thereby effectively improving network service processing efficiency.

The first bearer is set up in advance according to a first service attribute. The second bearer is set up in advance according to a second service attribute. A quantity of first bearers is not related to a quantity of terminals. A quantity of second bearers is not related to a quantity of base stations. The quantity of first bearers and the quantity of second bearers are determined by a service attribute of to-be-transmitted data. The quantity of first bearers and the quantity of second bearers are not necessarily corresponding to each terminal. In this patent application, data transmission problems of abundant terminals can be resolved by using a limited quantity of bearers. This avoids bearer signaling processes of the abundant terminals and delays generated therefrom, thereby effectively improving network service processing efficiency.

Optionally, the transmission method may further include step 304: determining the first bearer. The transmission method may further include step 305: determining the second bearer.

The first service attribute may be corresponding to an attribute of an air interface resource. Data using a same type of air interface resource may all be transmitted on the first bearer. For example, data of a same service category is scheduled to a same air interface resource. In this way, data of a same service category may be transmitted on a same first bearer. When there are multiple first bearers between the base station and the first network device, in step 304, the base station determines a first bearer corresponding to the air interface resource used by the data to perform data transmission. In step 302, the first bearer is corresponding to the air interface resource used by the data.

Optionally, the first service attribute may further be a first service quality characteristic. Data having a same type of first service quality characteristic may all be transmitted on the first bearer. When there are multiple first bearers between the base station and the first network device, in step 304, the base station determines a first bearer corresponding to the first service quality characteristic (QoS) of the data sent by the terminal. In step 302, the first bearer is corresponding to the first service quality characteristic of the data.

Optionally, the second service attribute may be a second service quality characteristic, and data having a same type of second service quality characteristic may all be transmitted on the second bearer. A level of the second service quality characteristic and a level of the first service quality characteristic may be the same, or may be different. Multiple different first service quality characteristics of adjacent levels may be combined into one second service quality characteristic of one level. When there are multiple second bearers between the second network device and the first network device, in step 305, the first network device determines a second bearer corresponding to the second service quality characteristic (QoS) of the data sent by the terminal. In step 302, the second bearer is corresponding to the second service quality characteristic of the data.

The following further describes the first bearer and the second bearer in detail.

Optionally, the data transmitted on the first bearer carries a first identifier of the terminal. The first identifier enables the base station and the first network device to accurately distinguish each terminal in management domains of the base station and the first network device. First identifiers of terminals may be orthogonal, quasi-orthogonal, or low-correlated. By using the first identifier, the base station may learn the first network device corresponding to the data received by the base station, and send the data to the first network device. The first network device may learn the base station corresponding to the data received by the first network device.

Optionally, the data transmitted on the second bearer carries an IP address of the terminal. There is a correspondence between the first identifier of the terminal and the IP address of the terminal. The IP address of the terminal may be allocated by a gateway when the terminal is attached. The first network device may search for and obtain, according to the correspondence by using the first identifier of the terminal, the IP address of the terminal. In this way, it is possible that no IP address needs to be carried during the data transmission on the first bearer and an air interface. Optionally, the transmission method may further include step 306: obtaining an IP address of the terminal according to the first identifier of the terminal.

Optionally, a bit quantity of the first identifier of the terminal is less than a bit quantity of the IP address of the terminal. The terminal can be identified on the air interface and the first bearer by using only the first identifier allocated to the terminal, so as to reduce air interface overheads.

Optionally, the first identifier of the terminal may be allocated by the first network device when the terminal is attached. The IP address of the terminal may be allocated by a gateway when the terminal is attached. The following further describes a specific method for allocating the first identifier and the IP address of the terminal in detail.

Optionally, the entire data transmission may be performed according to a data control policy of the terminal. During uplink data transmission, the first network device may obtain terminal information such as policy control information from a network controller, so as to complete authentication, encryption, QoS control, and the like of the terminal.

Optionally, the second network device may be a gateway. Alternatively, the second network device may be a server, for example, an application server. When the second network device is a server, the second network device can provide various application services for a user by using the Internet, so that the network can support an OTT (over the top) service capability. Especially, when a future network supports network slicing, a vertical service capability can be provided.

As shown in FIG. 4, in the data transmission method, there are one or more pre-setup first bearers between a first network device and a base station; and there are one or more pre-setup second bearers between the first network device and a second network device.

The transmission method includes the following steps.

Step 401: The second network device sends data to the first network device by using one second bearer. The first network device receives the data sent by the second network device.

Step 402: The first network device sends the data to the base station by using one first bearer. The base station receives the data sent by the first network device.

Step 403: The base station sends the data to a terminal by using an air interface resource.

For the first bearer and the second bearer, refer to the foregoing description.

Optionally, the transmission method may further include step 404: determining the second bearer. The transmission method may further include step 405: determining the first bearer. For a specific determining method, refer to the foregoing description. A main difference is that in step 404, the second network device determines a second bearer corresponding to a second service quality characteristic (QoS) of the data sent by the second network device. In step 401, the second bearer is corresponding to the second service quality characteristic of the data. In step 405, the first network device may determine a first bearer corresponding to a first service quality characteristic (QoS) of the data sent by the second network device. In step 402, the first bearer is corresponding to the first service quality characteristic of the data. In step 405, the first network device may further determine a first bearer corresponding to an attribute of an air interface resource used by the data sent by the second network device. In step 402, the first bearer is corresponding to the attribute of the air interface resource of the data.

Optionally, the data transmitted on the first bearer carries a first identifier of the terminal. The data transmitted on the second bearer carries an IP address of the terminal. For details, refer to the foregoing description. The transmission method may further include step 406: The first network device obtains the first identifier of the terminal according to the IP address of the terminal.

Figure 5:
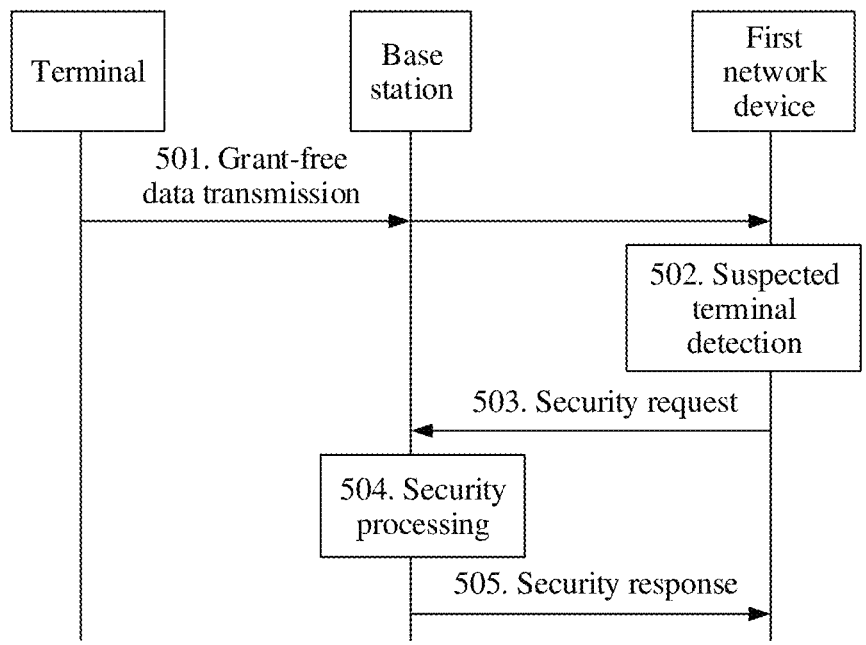
FIG. 5 is a schematic diagram of a data transmission method in a first network device integrated architecture according to another embodiment of this patent application.

FIG. 5 is a schematic diagram of a data transmission method in a first network device integrated architecture according to another embodiment of this patent application. The communication method enables security control, and therefore can avoid system congestion caused by continuous message sending by some malicious terminals. As shown in FIG. 5, the data transmission method includes the following steps.

Step 501: A first network device receives data of a terminal that is forwarded by a base station. For a detailed process of this step, refer to the foregoing step 301 and step 302.

Step 502: The first network device detects a suspected terminal. The suspected terminal is a terminal that maliciously attacks a system, for example, a terminal that frequently performs transmission or that has a security problem or a data encryption problem. The first network device may detect a suspected terminal by using a detection algorithm.

Step 503: When a suspected terminal is detected, the first network device sends a security request to the base station, where the security request carries an identity identifier of the suspected terminal. The identity identifier may be a permanent identifier of the terminal, for example, an international mobile subscriber identity (IMSI) or a mobile access code (MAC) address.

Step 504: The base station receives the security request. The base station performs security processing on data of the suspected terminal. The security processing may specifically include: blocking the data of the suspected terminal or performing re-authentication on the suspected terminal on an air interface.

Step 505: The base station sends a security response to the first network device. The security response carries the identity identifier of the terminal on which security processing is performed.

Figure 6:
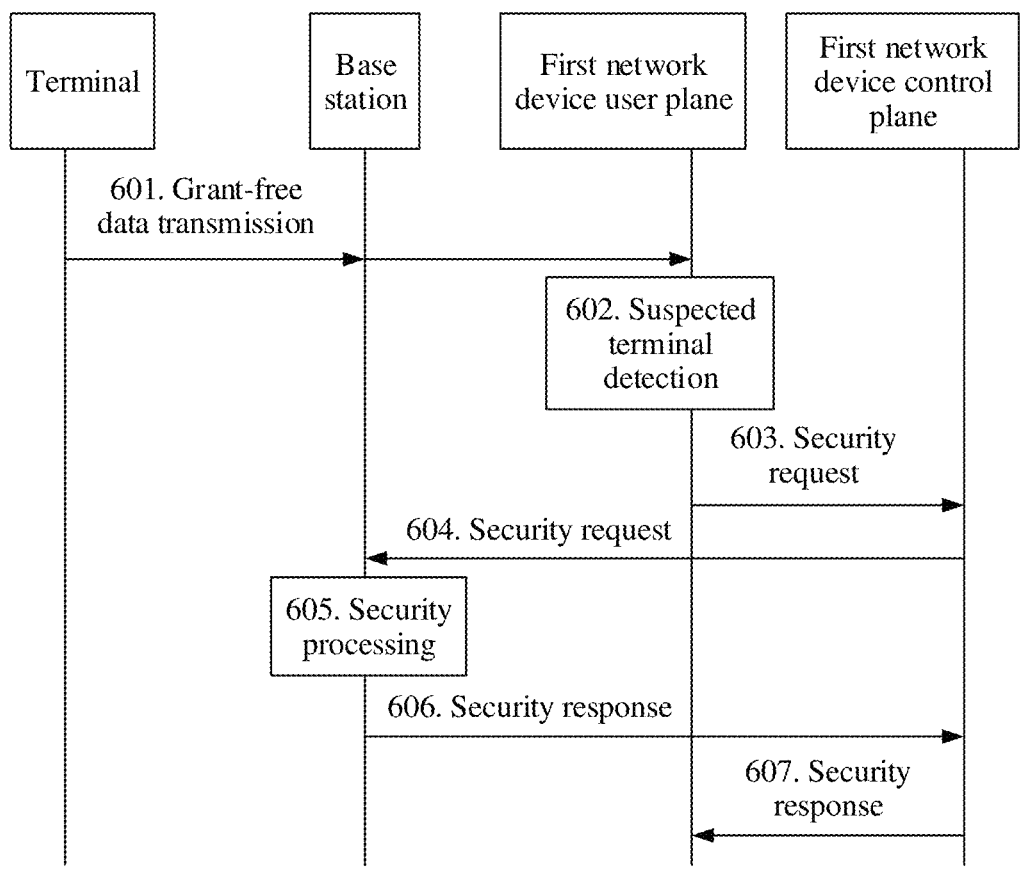
FIG. 6 is a schematic diagram of a data transmission method in a first network device separated architecture according to another embodiment of this patent application.

FIG. 6 is a schematic diagram of a data transmission method in a first network device separated architecture according to another embodiment of this patent application. The communication method enables security control. As shown in FIG. 6, the data transmission method includes the following steps.

Step 601: A first network device user plane receives data of a terminal that is forwarded by a base station. For a detailed process of this step, refer to the foregoing step 301 and step 302.

Step 602 is basically the same as step 502, but an execution body is the first network device user plane instead of a first network device.

Step 603: When a suspected terminal is detected, the first network device user plane sends a security request to a first network device control plane, so that the first network device control plane and the base station take security measures. The security request may carry an identifier of the suspected terminal.

Step 604: The first network device control plane receives the security request, and sends the security request to the base station.

Step 605: The base station receives the security request. The base station performs security processing on data of the suspected terminal. The security processing may specifically include: blocking the data of the suspected terminal or performing re-authentication on the suspected terminal on an air interface.

Step 606: The base station sends a security response to the first network device control plane. The security response carries the identifier of the terminal on which security processing is performed.

Step 607: The first network device control plane sends the security response to the first network device user plane, and the first network device user plane receives the security response. The security response carries the identifier of the terminal on which security processing is performed.

By using the foregoing security control, a malicious terminal can be prevented, system congestion can be avoided, and a transmission speed and efficiency of a system can be ensured.

The following describes a bearer setup method of this patent application. A bearer is mainly set up in advance separately between a first network device and a base station and between the first network device and a second network device. The bearer may be set up when the first network device is initialized or when the base station is initialized.

Figure 7:
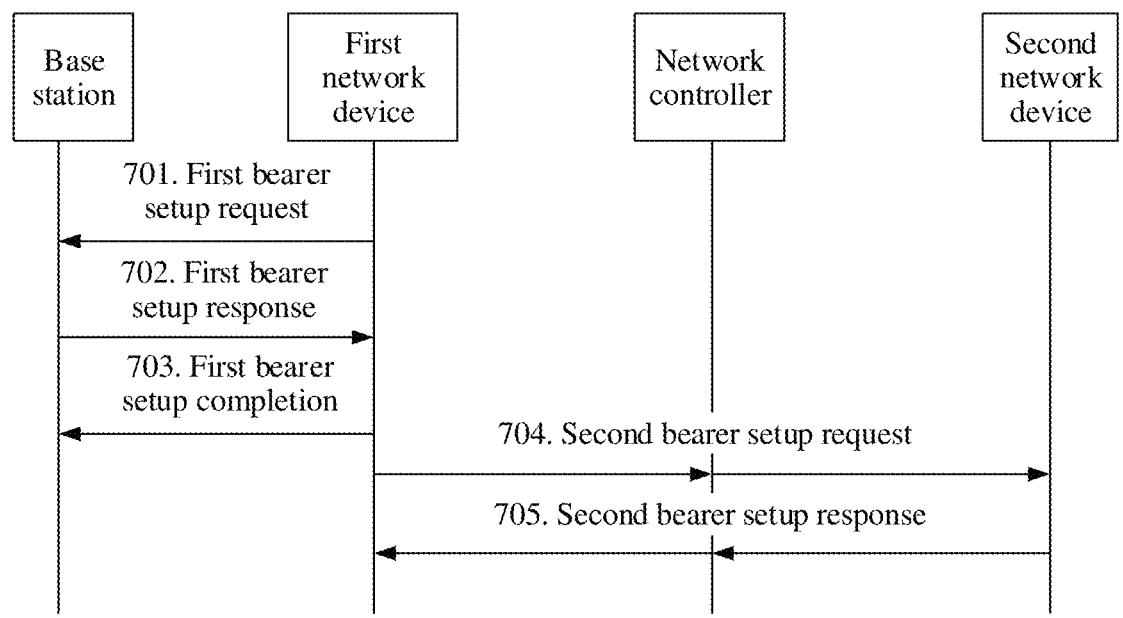
FIG. 7 is a schematic diagram of interaction of a bearer setup method in a first network device centralized architecture when a first network device is initialized.

FIG. 7 is a schematic diagram of interaction of a bearer setup method in a first network device centralized architecture when a first network device is initialized. As shown in FIG. 7, the bearer setup method includes the following steps.

Step 701: When the first network device is initialized, information about all base stations managed by the first network device is configured on the first network device. The first network device sends a first bearer setup request to a base station managed by the first network device. The first bearer setup request may carry an ID and an IP address of the first network device and first bearer information whose creation is requested. The first bearer information is corresponding to a first service attribute, and may include a QoS level, a requested bandwidth, and a port number.

Step 702: The base station receives the first bearer setup request, prepares a first bearer resource, and sends a first bearer setup response to the first network device. The first bearer setup response may carry an ID and an IP address of the base station and created first bearer information. The created first bearer information includes a QoS level, an allocated bandwidth, and a first bearer ID.

Step 703: The first network device receives the first bearer setup response sent by the base station, and sends first bearer setup completion information to the base station. The first bearer setup completion information may carry a first bearer setup completion indication. This step is mainly to prove that the base station receives the first bearer setup response of the first network device. This step is optional.

Step 704: The first network device sends a second bearer setup request to a second network device. The second network device may be a gateway. The second network device may also be a server, for example, an application server. The second bearer setup request may carry identification information of the first network device and second bearer information whose creation is requested. The second bearer information may include a QoS level and a requested bandwidth. The second bearer information is corresponding to a second service attribute.

Step 705: The second network device receives the second bearer setup request, completes bearer resource allocation, and sends a second bearer setup response to the first network device. The first network device receives the second bearer setup response sent by the second network device. The second bearer setup response may carry an ID and an IP address of the second network device, the ID and the IP address of the first network device, and created second bearer information. The created second bearer information includes a QoS level, an allocated bandwidth, and a second bearer ID.

The first bearer and the second bearer start to be set up when the first network device is initialized. A bearer is not necessarily set up only when data is transmitted or a terminal is attached. This avoids an access delay and a transmission scheduling delay during data transmission, thereby effectively improving network service processing efficiency.

According to a requirement, multiple first bearers and second bearers may be simultaneously created. The first bearer is set up according to the first service attribute, and the second bearer is set up according to the second service attribute. Bearers may be separately set up for services of different categories. In this way, only one first bearer can be set up for a same type of service of different terminals, so that the first bearer can be used to transmit data of a same type of service of different terminals.

The first service attribute may specifically be first QoS of a service that the terminal needs to run. Alternatively, the first service attribute may be an attribute of an air interface resource used by a service of the terminal. A difference between the two cases lies in a granularity of processing terminal services by the base station. When an authorized bearer is to set up according to QoS of a service, the base station needs to set up the bearer according to a type of QoS level. However, when a bearer is to set up according to a used air interface resource, the bearer is set up for a type of air interface resource according to an air interface resource configured by the base station. It should be noted that, when a bearer is to set up according to a QoS level, one bearer may be set up according to several different QoS levels, so as to reduce a quantity of bearers.

The second service attribute may be second QoS of the service. When the second bearer is set up, services from base stations may be recombined, and services having a same first QoS attribute are transmitted on a same second bearer, or multiple services of different first QoS attributes may be transmitted on a same second bearer.

A quantity of first bearers and a quantity of second bearers are determined by a service attribute of to-be-transmitted data. The quantity of first bearers is not related to a quantity of terminals. The quantity of second bearers is not related to a quantity of base stations. Both the quantity of first bearers and the quantity of second bearers are less than a quantity of terminals managed by the bases station. The quantity of first bearers and the quantity of second bearers are not necessarily corresponding to each terminal. Data transmission problems of abundant terminals can be resolved by using a limited quantity of bearers. This avoids bearer signaling processes and delays generated therefrom.

After setup, the first bearer and the second bearer are always retained for data transmission. When data is transmitted, no bearer needs to be set up again, and after one data transmission is completed, the first bearer and the second bearer are not deleted. The first bearer and the second bearer only need to be set up once. The first bearer and the second bearer do not need to be constantly created or deleted according to a change of a terminal state.

In a solution, in step 701, the first network device may also choose to send a multicast message to all base stations managed by the first network device. Then, the first network device receives a message returned by each base station. After receiving the message returned by each base station, the first network device sets up the second bearer to the second network device according to a bandwidth requirement of each base station.

The first bearer and the second bearer are two independent bearers. There may be one or more first bearers. When there is one first bearer, all grant-free services managed by the base station are transmitted on the only first bearer. When there are multiple first bearers, a corresponding first bearer may be selected according to a requirement to perform data transmission.

There may be one or more second bearers. When there is one second bearer, grant-free services of all the base stations managed by the first network device are transmitted on the only second bearer. When there are multiple second bearers, a corresponding first bearer may be selected according to a requirement to perform data transmission.

A quantity of bearers is determined according to a service attribute, and is not related to the quantity of terminals and the quantity of base stations. In this embodiment, it is not necessary to set up a bearer for each grant-free terminal. The quantity of bearers is not necessarily in a one-to-one correspondence with the quantity of terminals, and the quantity of bearers is limited. Compared with the prior art, in this patent application, a quantity of bearers that need to be set up is greatly reduced, thereby effectively improving network service processing efficiency.

Figure 8:
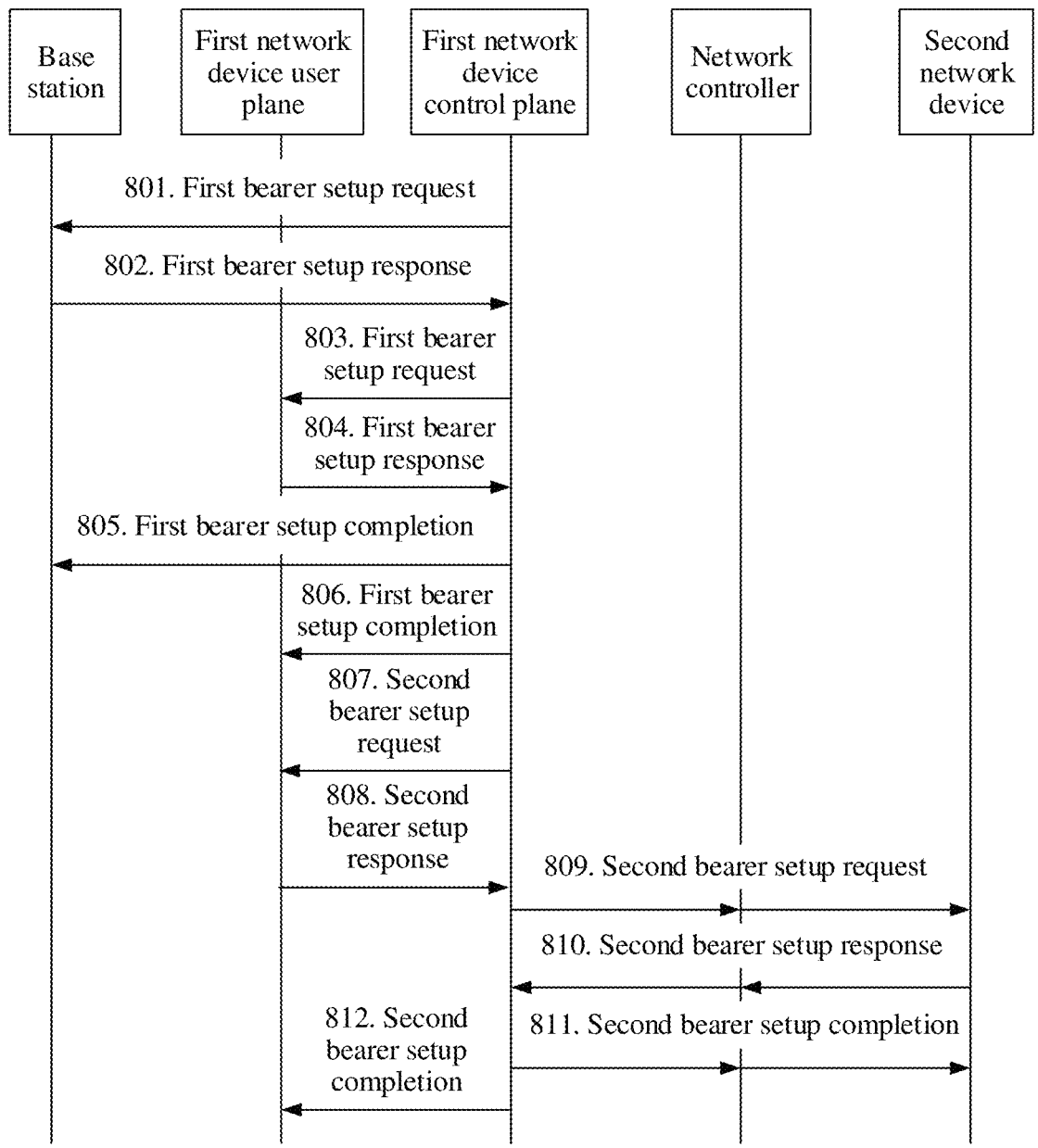
FIG. 8 is a schematic diagram of interaction of a bearer setup method in a first network device separated architecture when a first network device is initialized.

FIG. 8 is a schematic diagram of interaction of a bearer setup method in a first network device separated architecture when a first network device is initialized. A main difference between the bearer setup method shown in FIG. 8 and the bearer setup method shown in FIG. 7 is that: In FIG. 8, specifically, a first network device control plane initiates a bearer setup request, and interaction between the first network device control plane and a first network device user plane is added. Specifically, the method includes the following steps.

Step 801: The first network device control plane sends a first bearer setup request to a base station. The first bearer setup request may carry an ID and an IP address of the first network device control plane, and first bearer information whose creation is requested. The first bearer information whose creation is requested may include a QoS level and a requested bandwidth.

Step 802: The base station receives the first bearer setup request, prepares a resource for a first bearer, and sends a first bearer setup response to the first network device control plane. The first bearer setup response may carry an ID and an IP address of the base station and first bearer information allocated by the base station. The first bearer information allocated by the base station may include a QoS level, an allocated bandwidth, and a first bearer ID.

Step 803: The first network device control plane receives the first bearer setup response sent by the base station, and may select, according to a service attribute, one first network device user plane controlled by the first network device control plane, and send the first bearer setup request to the first network device user plane. The first bearer setup request may carry the ID and the IP address of the base station, and the first bearer information allocated by the base station.

Step 804: After the first network device user plane receives the first bearer setup request, the first network device user plane sends a first bearer setup response to the first network device control plane. The first bearer setup response may carry an ID and an IP address of the first network device user plane, the ID and the IP address of the base station, and first bearer information allocated by the first network device user plane. The allocated first bearer information may include a QoS level, an allocated bandwidth, and a first bearer ID.

Steps 805 and 806: After the first network device control plane receives the first bearer setup response sent by the first network device user plane, the first network device control plane separately sends first bearer setup completion information to the base station (805) and the first network device user plane (806). The first bearer setup completion information may carry a first bearer setup completion indication, the ID and the IP address of the first network device user plane, the ID and the IP address of the base station, and first bearer information whose creation is completed. The first bearer information whose creation is completed may include the QoS level, the allocated bandwidth, and the first bearer ID. This step is mainly to notify the first network device user plane and the base station of the first bearer information whose creation is completed.

Step 807: The first network device control plane sends a second bearer setup request to the first network device user plane. The first network device control plane may simultaneously set up second bearers for first network device user planes managed by the first network device control plane. QoS of each second bearer may be determined according to QoS of the first bearer and a control policy. The second bearer setup request may carry the ID and the IP address of the first network device control plane and an ID and an IP address of a target first network device user plane.

Step 808: After the first network device user plane receives the second bearer setup request, the first network device user plane sends a second bearer setup response to the first network device control plane. The second bearer setup response may carry the ID and the IP address of the first network device user plane, the ID and the IP address of the first network device control plane, and second bearer information allocated by the first network device user plane. The allocated second bearer information includes a QoS level, an allocated bandwidth, and a second bearer ID.

Step 809: After receiving the second bearer setup response from the first network device user plane, the first network device control plane sends a second bearer setup request to a second network device, so as to separately set up a second bearer for each first network device user plane. The second bearer setup request may carry the ID and the IP address of the first network device control plane, an ID and an IP address of each first network device user plane, and second bearer information allocated by each first network device user plane. The allocated second bearer information may include a QoS level, an allocated bandwidth, and a second bearer ID.

Step 810: After receiving the second bearer setup request and completing bearer resource allocation, the second network device returns, to the first network device control plane, a second bearer setup response corresponding to each first network device user plane. The second bearer setup response may carry an ID and an IP address of the second network device, the ID and the IP address of each first network device user plane, and second bearer information allocated by the second network device to each first network device user plane. The allocated second bearer information may include a QoS level, an allocated bandwidth, and a second bearer ID.

Steps 811 and 812: The first network device control plane sends second bearer setup completion information to the second network device (811) and the first network device user plane (812). The second bearer setup completion information may carry the ID and the IP address of the second network device, the ID and the IP address of the first network device user plane, and the second bearer information whose creation is completed and that is created for the first network device user plane. The second bearer information includes the QoS level, the allocated bandwidth, and the second bearer ID. This step is mainly to notify the first network device user plane and the second network device of the second bearer information whose creation is completed.

Figure 9:
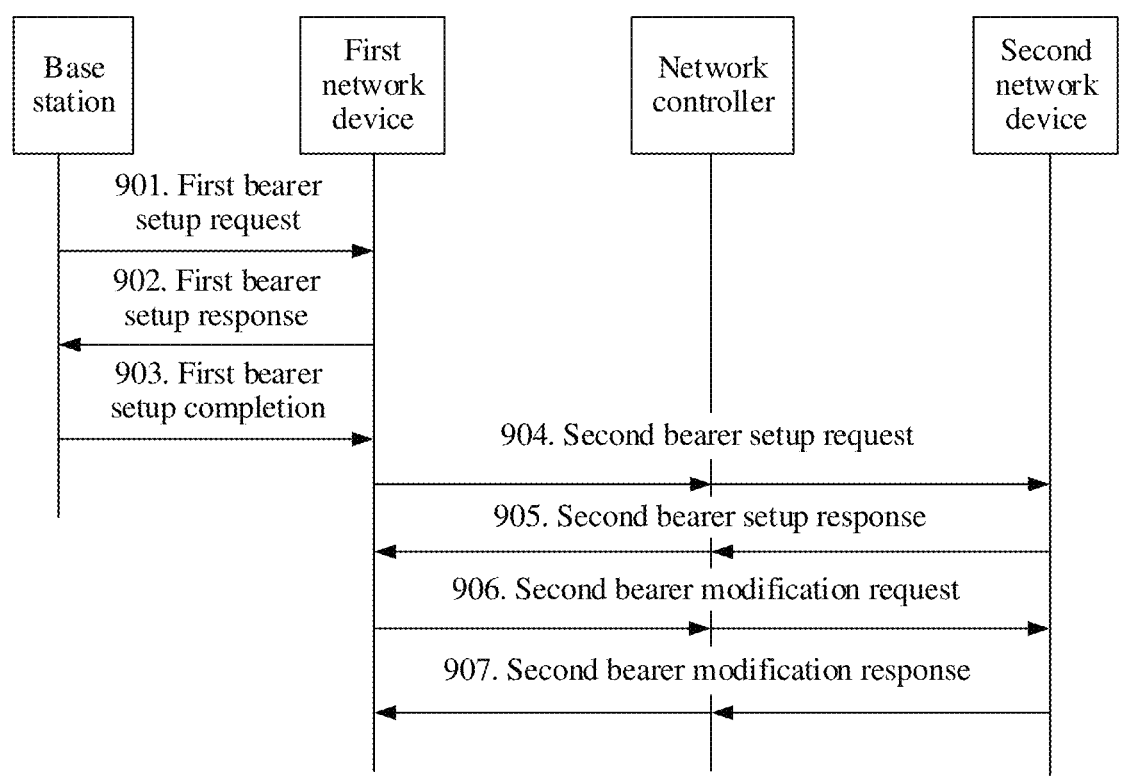
FIG. 9 is a schematic diagram of interaction of a bearer setup method in a first network device centralized architecture when a base station is initialized.

FIG. 9 is a schematic diagram of interaction of a bearer setup method in a first network device centralized architecture when a base station is initialized. As shown in FIG. 9, the bearer setup method includes the following steps.

Step 901: When the base station is initialized, the base station sends a first bearer setup request to a first network device. The first bearer setup request may carry an ID and an IP address of the base station and first bearer information whose creation is requested (including a QoS level and a requested bandwidth). The first bearer setup request may further carry information about resources respectively allocated by the base station to different CTUs, and the information includes an air interface frequency, an air interface bandwidth, a modulation and coding scheme, and a service attribute corresponding to each CTU. The service attribute may be a QoS level of a service.

Step 902: The first network device receives the first bearer setup request, prepares a first bearer resource, and sends a first bearer setup response to the base station. The first bearer setup response may carry an ID and an IP address of the first network device and created first bearer information. The created first bearer information may include a QoS level, an allocated bandwidth, and a first bearer ID.

Step 903: The base station receives the first bearer setup response sent by the first network device, and sends first bearer setup completion information to the first network device, where the first bearer setup completion information may carry a first bearer setup completion indication. This step is mainly to prove that the first network device receives the first bearer setup response of the base station. This step is optional.

When there is no second bearer between the first network device and a second network device, step 904 and step 905 may be performed. When there is a second bearer between the first network device and the second network device, if a bandwidth allocated by the base station to a grant-free service is relatively large or relatively small, a bandwidth between the first network device and the second network device may consequently be insufficient or redundant. In this case, the transmission bandwidth between the first network device and the second network device needs to be modified, and step 906 and step 907 are performed. If the bandwidth between the first network device and the second network device is sufficient, no step needs to be performed.

Step 904: The first network device sends a second bearer setup request to the second network device, where the second bearer setup request may carry the ID and the IP address of the first network device and second bearer information whose creation is requested. The second bearer information whose creation is requested may include a QoS level and a requested bandwidth.

Step 905: The second network device receives the second bearer setup request, completes bearer resource allocation, and sends a second bearer setup response to the first network device. The first network device receives the second bearer setup response sent by the second network device. The second bearer setup response may carry an ID and an IP address of the second network device, identification information of the first network device, and created second bearer information. The created second bearer information includes a QoS level, an allocated bandwidth, and a second bearer ID.

Step 906: The first network device sends a second bearer modification request to the second network device, where the second bearer modification request may carry a requested modified bandwidth.

Step 907: The second network device receives the second bearer modification request, completes bearer resource modification, and sends a second bearer modification response to the first network device. The first network device receives the second bearer modification response sent by the second network device. The second bearer modification response may carry identification information of a second bearer, and a modified bandwidth allocated to the second bearer.

When the second network device is a server, a second bearer between the server and the first network device may be set up when the server is initialized. For a setup process of the second bearer, refer to the foregoing description.

Figure 10:
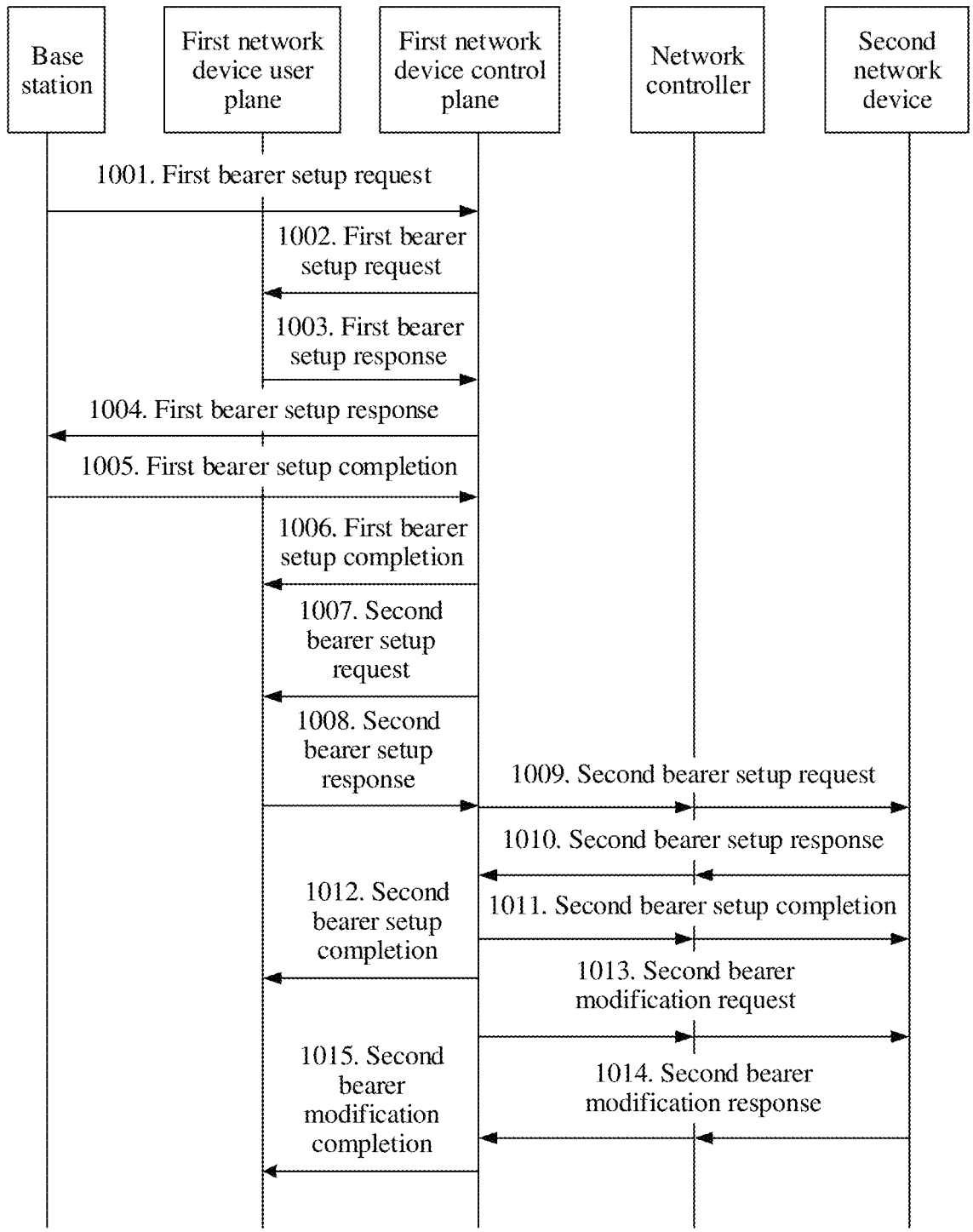
FIG. 10 is a schematic diagram of interaction of a bearer setup method in a first network device separated architecture when a base station is initialized.

FIG. 10 is a schematic diagram of interaction of a bearer setup method in a first network device separated architecture when a base station is initialized. A main difference between the bearer setup method shown in FIG. 10 and the bearer setup method shown in FIG. 9 is that: In FIG. 10, specifically, the base station initiates a bearer setup request to a first network device control plane, and interaction between the first network device control plane and a first network device user plane is added. Specifically, the method includes the following steps.

Step 1001: similar to step 901. When the base station is initialized, the base station sends a first bearer setup request to the first network device control plane. The first bearer setup request may carry an ID and an IP address of the base station and first bearer information whose creation is requested. The first bearer information whose creation is requested includes a QoS level and a requested bandwidth. The first bearer setup request may further carry information about resources respectively allocated by the base station to different CTUs, and the information includes an air interface frequency, an air interface bandwidth, a modulation and coding scheme, and a service attribute corresponding to each CTU. The service attribute may be a QoS level of a service.

Step 1002: The first network device control plane sends a first bearer setup request to the first network device user plane, so as to instruct the first network device user plane to prepare a bearer resource. The first bearer setup request sent to the first network device user plane may carry the ID and the IP address of the base station and the first bearer information whose creation is requested. The first bearer information whose creation is requested includes the QoS level and the requested bandwidth. The requested bandwidth is a bandwidth of a bearer between the base station and the first network device user plane.

Step 1003: The first network device user plane receives the first bearer setup request, and sends a first bearer setup response to the first network device control plane. The first network device user plane returns a bearer setup result to the first network device control plane. The first bearer setup response may carry an ID and an IP address of the first network device user plane and first bearer information allocated by the first network device user plane. The first bearer information includes a QoS level, an allocated bandwidth, and a first bearer ID.

Step 1004: The first network device control plane receives the first bearer setup response, and sends the first bearer setup response to the base station.

Step 1005: The base station receives the first bearer setup response sent by the first network device control plane, and sends first bearer setup completion information to the first network device control plane, where the first bearer setup completion information may carry the ID and the IP address of the first network device user plane and first bearer information created for the first network device user plane. The first bearer information includes a QoS level, an allocated bandwidth, and a first bearer ID.

Step 1006: The first network device control plane sends the first bearer setup completion message to the first network device user plane. The message may carry the ID and the IP address of the first network device user plane and the first bearer information created for the first network device user plane. The first bearer information may include the QoS level, the allocated bandwidth, and the first bearer ID.

When there is no second bearer between the first network device control plane and a second network device, step 1007 to step 1012 may be performed. When there is a second bearer between the first network device control plane and the second network device, if a bandwidth allocated by the base station to a grant-free service is relatively large or relatively small, a bandwidth between the first network device control plane and the second network device may consequently be insufficient or redundant. In this case, the transmission bandwidth between the first network device control plane and the second network device needs to be modified, and step 1013 and step 1014 are performed. If the bandwidth between the first network device control plane and the second network device is sufficient, no step needs to be performed.

Step 1007: The first network device control plane sends a second bearer setup request to the first network device user plane, so as to instruct the first network device user plane to prepare a bearer resource. The second bearer setup request sent to the first network device user plane may carry an ID and an IP address of the first network device control plane, the ID and the IP address of the base station, and a resource allocation request indication.

Step 1008: After receiving the second bearer setup request, a grant-free user plane may simultaneously set up a second bearer. QoS of each second bearer may be determined according to QoS of the first bearer and a control policy of the requesting base station. After completing the bearer resource preparation, the grant-free user plane sends a second bearer setup response to the first network device control plane, so that the first network device user plane returns prepared bearer resource information to the first network device control plane. The first network device user sends the second bearer setup response to the first network device control plane. The second bearer setup response may carry the ID and the IP address of the first network device user plane and the allocated first bearer information. The first bearer information includes the QoS level, the allocated bandwidth, and the first bearer ID.

Step 1009: The first network device control plane sends a second bearer setup request to the second network device, and may simultaneously set up a bearer for the grant-free user plane. The second bearer setup request may carry the ID and the IP address of the first network device control plane and second bearer information whose creation is quested. The bearer information may include a QoS level and a requested bandwidth.

Step 1010: The second network device receives the second bearer setup request, completes bearer resource allocation, and sends a second bearer setup response to the first network device control plane. The first network device control plane receives the second bearer setup response sent by the second network device. The second bearer setup response may carry an ID and an IP address of the second network device, identification information of the first network device control plane, and second bearer information allocated by the second network device. The second bearer information may include a QoS level, an allocated bandwidth, and a second bearer ID.

Step 1011: The first network device control plane sends a bearer setup completion message to the second network device. The message may carry the ID and the IP address of the second network device, the ID and the IP address of the first network device user plane, and the created second bearer ID.

Steps 1011 and 1012: The first network device control plane separately sends the second bearer setup completion message to the second network device (1011) and the first network device user plane (1012). The second bearer setup completion message may carry the ID and the IP address of the first network device control plane, the ID and the IP address of the first network device user plane, and second bearer information whose creation is completed. The second bearer information may include the QoS level, the allocated bandwidth, and the second bearer ID.

Step 1013: The first network device control plane sends a second bearer modification request to the second network device, where the second bearer modification request may carry a requested modified bandwidth.

Steps 1014 and 1015: The first network device control plane receives second bearer modification responses respectively sent by the second network device (1014) and the first network device user plane (1015). The second bearer modification response may carry identification information of the second bearer and a modified bandwidth allocated to the second bearer.

FIG. 7 to FIG. 10 are related to setup and modification of a second bearer, and interaction between the first network device and the second network device or interaction between the first network device control plane and the second network device may be forwarded by a network controller. With the network controller for forwarding, a solution in this patent application can be compatible with an existing network system.

In an LTE system, after completing random access, a cell radio network temporary identifier (C-RNTI) is allocated to a UE for air interface transmission and connected state identification. In addition, an IP address of the UE is obtained after setup of a default bearer is completed, and a P-GW completes allocation of the IP address. Because there will be a large quantity of MTC terminals in the future, if an independent bearer is set up for each terminal, a gateway cannot manage such abundant bearer contexts, and setup of abundant bearers imposes a great technical challenge. When there is no core network bearer, how to allocate an address to an MTC terminal becomes a problem.

For this case, this patent application proposes that in a terminal attach process, a first network device allocates a first identifier of a terminal, so that the terminal performs data transmission on an air interface, so as to uniquely identify the terminal and reduce air interface overheads. A gateway allocates an IP address of the terminal, so as to implement communication with a network. A bit quantity of the first identifier is less than a bit quantity of the IP address. Using the first identifier to identify the terminal between the air interface and the base station and between the base station and the first network device can reduce the air interface overheads. After receiving data of the air interface, the first network device restores the first identifier to the IP address to perform transmission on the network.

When first accessing the network, the terminal obtains the IP address of the terminal according to a unique ID allocated by the first network device by using a pre-setup bearer between the first network device and the gateway. Access only needs to be performed once. Subscription information of a user can be obtained, and a first identifier of the user is obtained, so as to provide a control basis for subsequent data transmission.

The first identifier allocated by the first network device to the terminal is used to uniquely identify one terminal within a range of the first network device. By using the first identifier, the first network device can associate and manage data related to the terminal.

Figure 11:
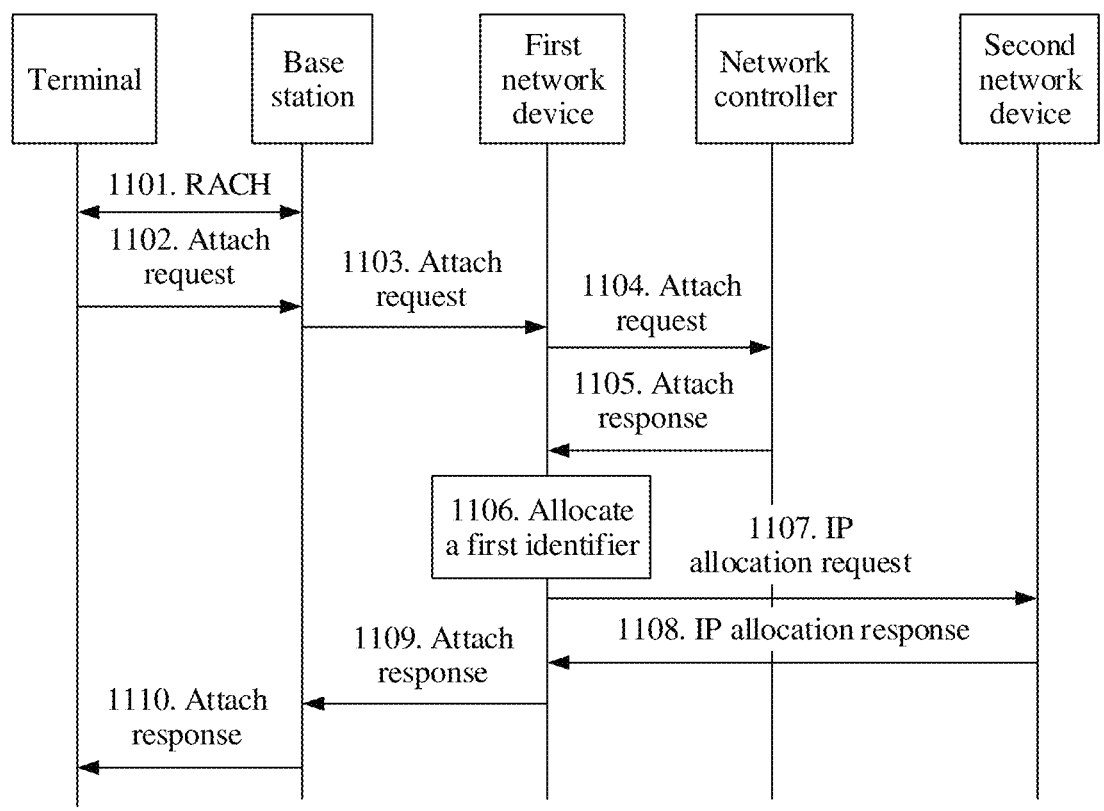
FIG. 11 and FIG. 12 are schematic flowcharts of two different embodiments in which a terminal is attached to a network in a first network device integrated architecture.

FIG. 11 is a schematic diagram of a terminal attach method according to an embodiment of this patent application. As shown in FIG. 11, the method includes the following steps.

Step 1101: Perform a random access process (RACH) between a terminal and a base station. The random access process may be a common random access process, or may be a random access process performed on a grant-free resource.

Step 1102: The terminal sends an attach request message to the base station by using an air interface resource. The message may carry an IMSI, a MAC address, an attach type, an encryption option, and the like that are of the terminal.

Step 1103: The base station receives the attach request, and does not parse the attach request. The base station directly sends the attach request to a first network device by using a first bearer. ID information or IP address information of the base station may be added to the attach request.

Step 1104: The first network device receives the attach request, and does not parse the attach request. The first network device sends an authentication request to a network controller. A message name may be a security message or an attach request. The message may carry information about the base station currently serving the terminal, identification information of the first network device, and authentication information, security information, and a control policy that are of the terminal.

Step 1105: After receiving the attach request, the network controller sends an attach response to the first network device. A message name may be a security response or an authentication response. The attach response may carry a control policy, an authentication encryption parameter, and possible gateway information. The possible gateway information is information about a selected gateway when there are possibly multiple gateways.

Step 1106: The first network device receives the attach response from the network controller, and the first network device allocates a first identifier to the terminal.

Step 1107: The first network device sends an IP allocation request to a corresponding gateway. The IP allocation request may carry a permanent ID of the terminal. The permanent ID may include the IMSI and the MAC address.

Step 1108: The gateway receives the IP allocation request, allocates an IP address to the terminal, and sends an IP allocation response to the first network device. The allocation response may carry an IP address of the gateway, the permanent ID of the terminal, the IP address allocated to the terminal, and an ID or an IP address of the base station serving the terminal.

Step 1109: After receiving the IP allocation response, the first network device may set up a correspondence between the first identifier and the IP address in the first network device, where the correspondence includes uplink mapping and downlink mapping. The uplink mapping indicates that data received by the base station from the terminal is identified by using the first identifier allocated by the first network device, and the first identifier needs to be restored to a normal IP address. The downlink mapping indicates that for data sent by the gateway to the first network device, the first network device converts the IP address into the first identifier, so that transmission is performed on the air interface between the base station and the terminal. The first network device sends the attach response to the base station. The attach response may carry the ID or the IP address of the first network device, the first identifier allocated by the first network device to the terminal, the IP address allocated by the gateway to the terminal, and the authentication encryption parameter.

Step 1110: After receiving the attach response, the base station sends the attach response to the terminal. The attach response sent to the terminal may carry the first identifier allocated by the first network device to the terminal, the IP address allocated by the gateway to the terminal, and the authentication encryption parameter.

The first identifier allocated by the first network device to the terminal may be orthogonal, for example, a Zadoff-Chu (ZC) sequence. This enables the base station to detect the terminal by using the first identifier with ease.

A length of the first identifier should be as short as possible, so as to lower detection complexity of the base station. However, an excessively short sequence reduces a quantity of supported terminals, and therefore, the first identifier allocated by the first network device should have a proper length.

In addition, to ensure that a first identifier can be allocated to each terminal, terminals may be classified into a static terminal, a slowly moving terminal, and a fast moving terminal. A slow speed and a fast speed are determined according to an actual requirement. If a moving speed is less than 5 km/h, the moving speed is a slow speed. If a moving speed is greater than or equal to 5 km/h, the moving speed is a fast speed. A group of first identifiers may be pre-allocated to each type of terminal. When a first identifier is allocated to a specific terminal, one first identifier may be selected from a group of first identifiers corresponding to an attribute of the terminal, and then allocated to the terminal. A first identifier of a static terminal or a slowly moving terminal may be reused in different ranges. A first identifier of a fast moving terminal needs to be maintained unique in a greater range.

Figure 12:
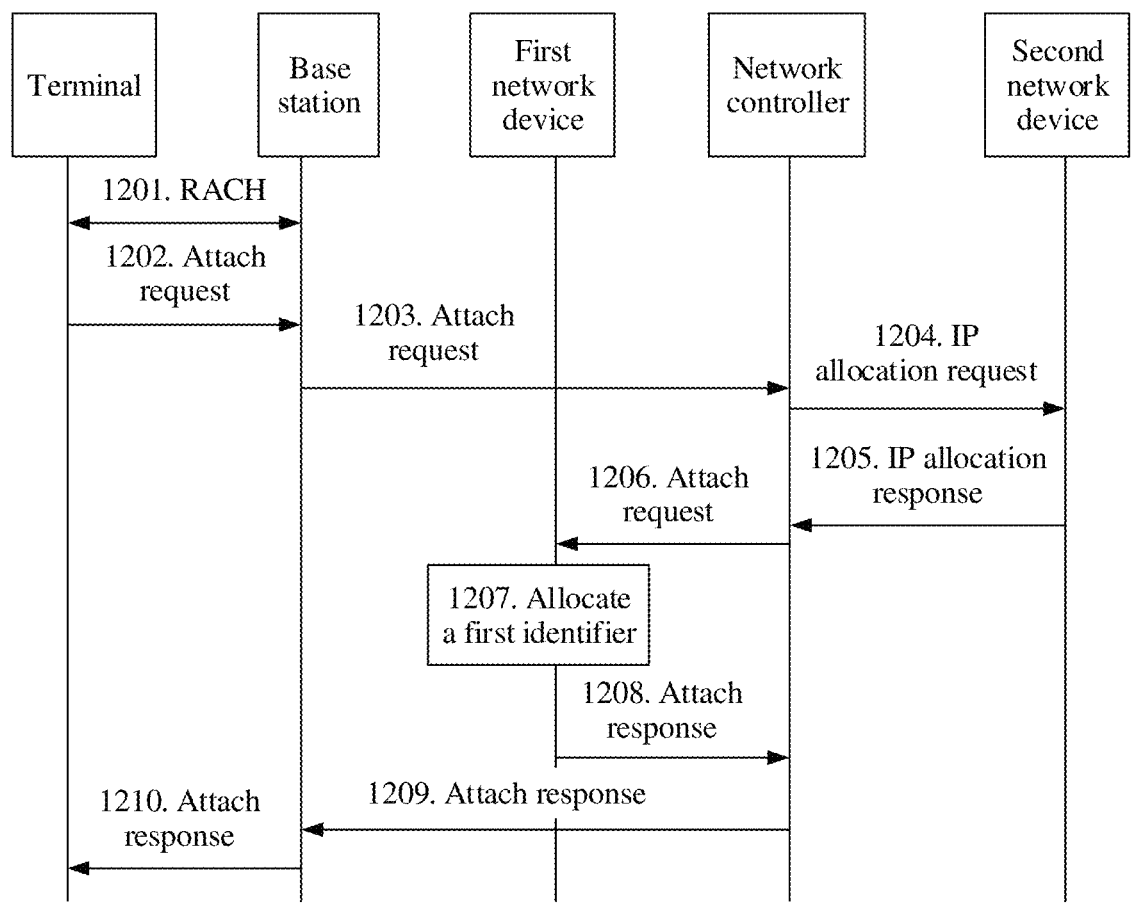

FIG. 12 is a schematic diagram of a terminal attach method according to another embodiment of this patent application. A main difference between FIG. 12 and FIG. 11 is that a base station directly sends an attach request to a network controller. As shown in FIG. 12, the method includes the following steps.

Step 1201: same as step 1101.

Step 1202: same as step 1102.

Step 1203: The base station receives the attach request, parses the attach request, and sends the attach request to the network controller after parsing the attach request. The attach request may carry ID information or IP address information of the base station, and an IMSI, a MAC address, an attach type, and an encryption option that of the terminal.

Step 1204: After receiving the attach request, the network controller sends an IP allocation request to a gateway. The IP allocation request may carry a permanent ID of the terminal. The permanent ID may include the IMSI and the MAC address.

Step 1205: The gateway receives the IP allocation request, allocates an IP address to the terminal, and sends an IP allocation response to the network controller. The allocation response may carry an IP address of the gateway, the permanent ID of the terminal, and the IP address allocated to the terminal.

Step 1206: After receiving the IP allocation response, the network controller sends an attach request to a first network device control plane, where the attach request may carry the ID or the IP address of the base station, and the IMSI, the MAC address, the attach type, the encryption option, and the IP address that are of the terminal.

Step 1207: After receiving the attach request, the first network device allocates a first identifier to the terminal. The first network device may further set up a correspondence between the first identifier and the IP address, and the correspondence includes uplink mapping and downlink mapping. The uplink mapping indicates that data received by the base station from the terminal is identified by using the first identifier, and the first identifier needs to be restored to a normal IP address. The downlink mapping indicates that for data sent by the gateway to a first network device user plane, the first network device converts the IP address into the first identifier, so that transmission is performed on the air interface between the base station and the terminal.

Step 1208: After receiving the attach response, the first network device sends the attach response to the network controller. The attach response may carry the first identifier allocated by the first network device to the terminal and the IP address allocated by the gateway to the terminal.

Step 1209: The network controller sends the attach response to the base station. The attach response may carry the ID or the IP address of the first network device, the first identifier allocated by the first network device to the terminal, the IP address allocated by the gateway to the terminal, and an authentication encryption parameter.

Step 1210: same as step 1110.

In a first network device separated architecture, a terminal attach process in a network is basically similar to a process in a first network device integrated architecture. A difference is that: Because a first network device is divided into a control plane and a user plane, the control plane is used for control information and policy of a terminal, and the user plane is used for data transmission. When initially attached, the terminal interacts with the control plane. Because a bearer is set up between the user plane and a gateway, allocation of a first identifier needs to be implemented by using the first network device user plane. In addition, the control information of the terminal needs to be inserted into the control plane.

Figure 13:
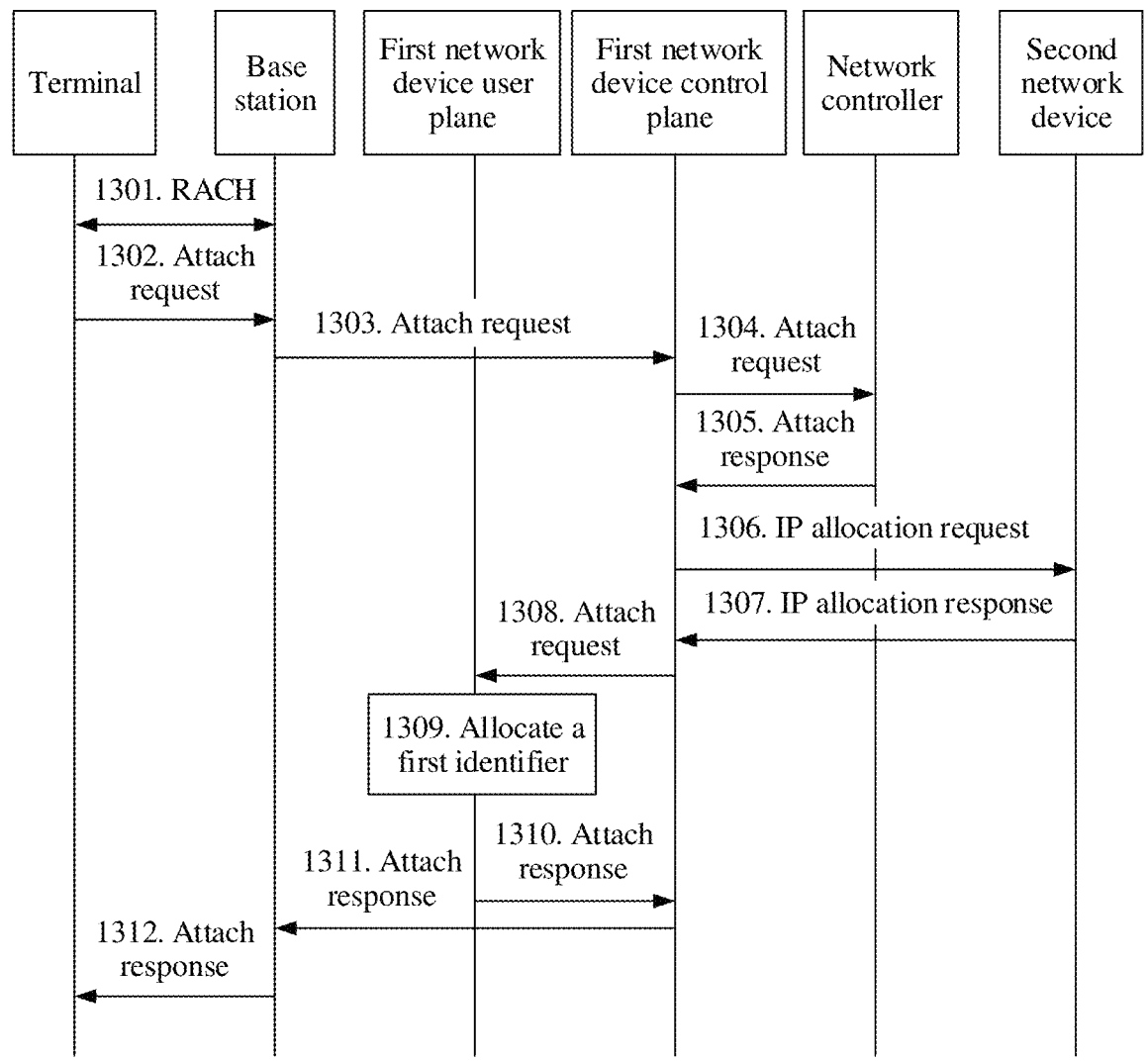
FIG. 13 to FIG. 15 are schematic flowcharts of three different embodiments in which a terminal is attached to a network in a first network device separated architecture.
Figure 14:
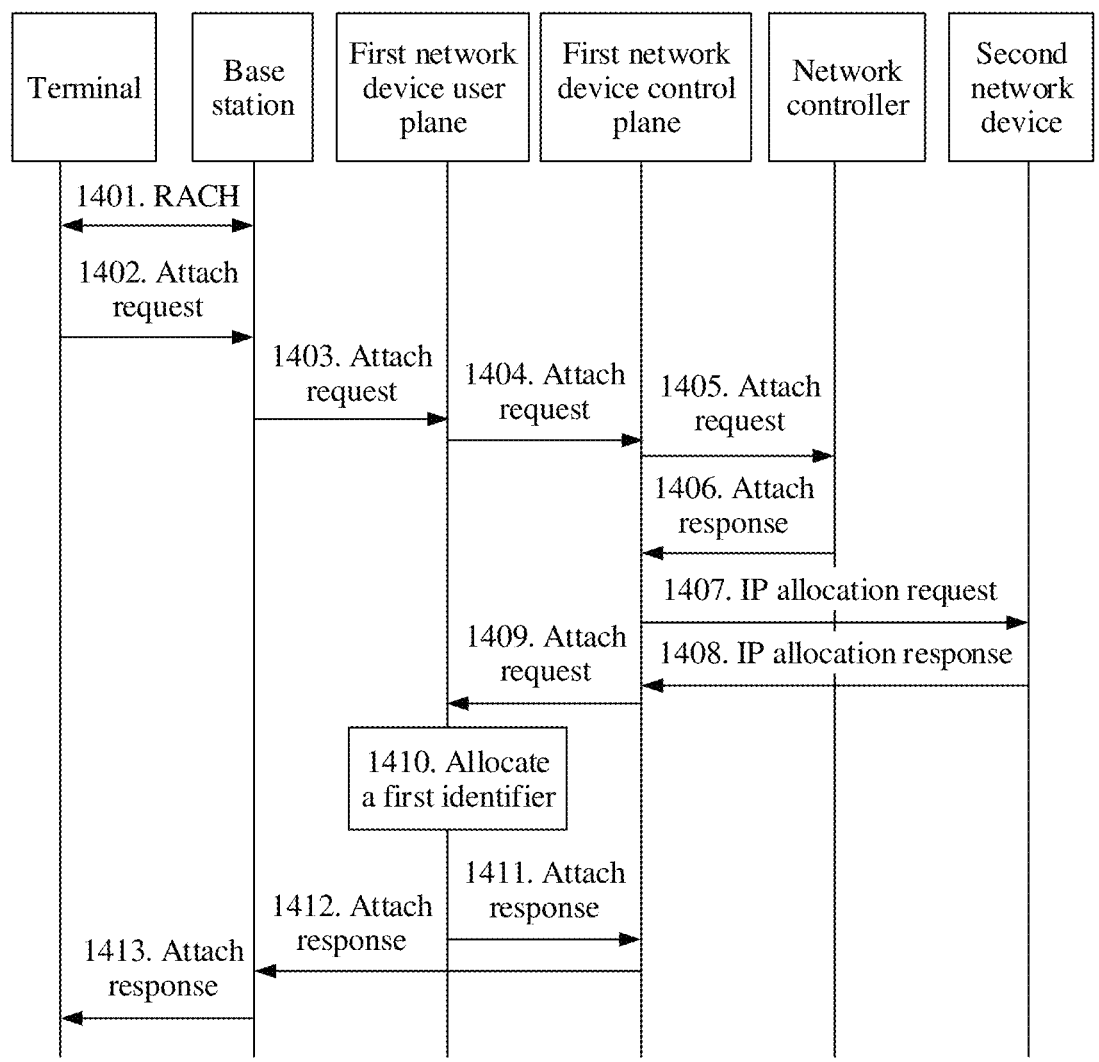
Figure 15:
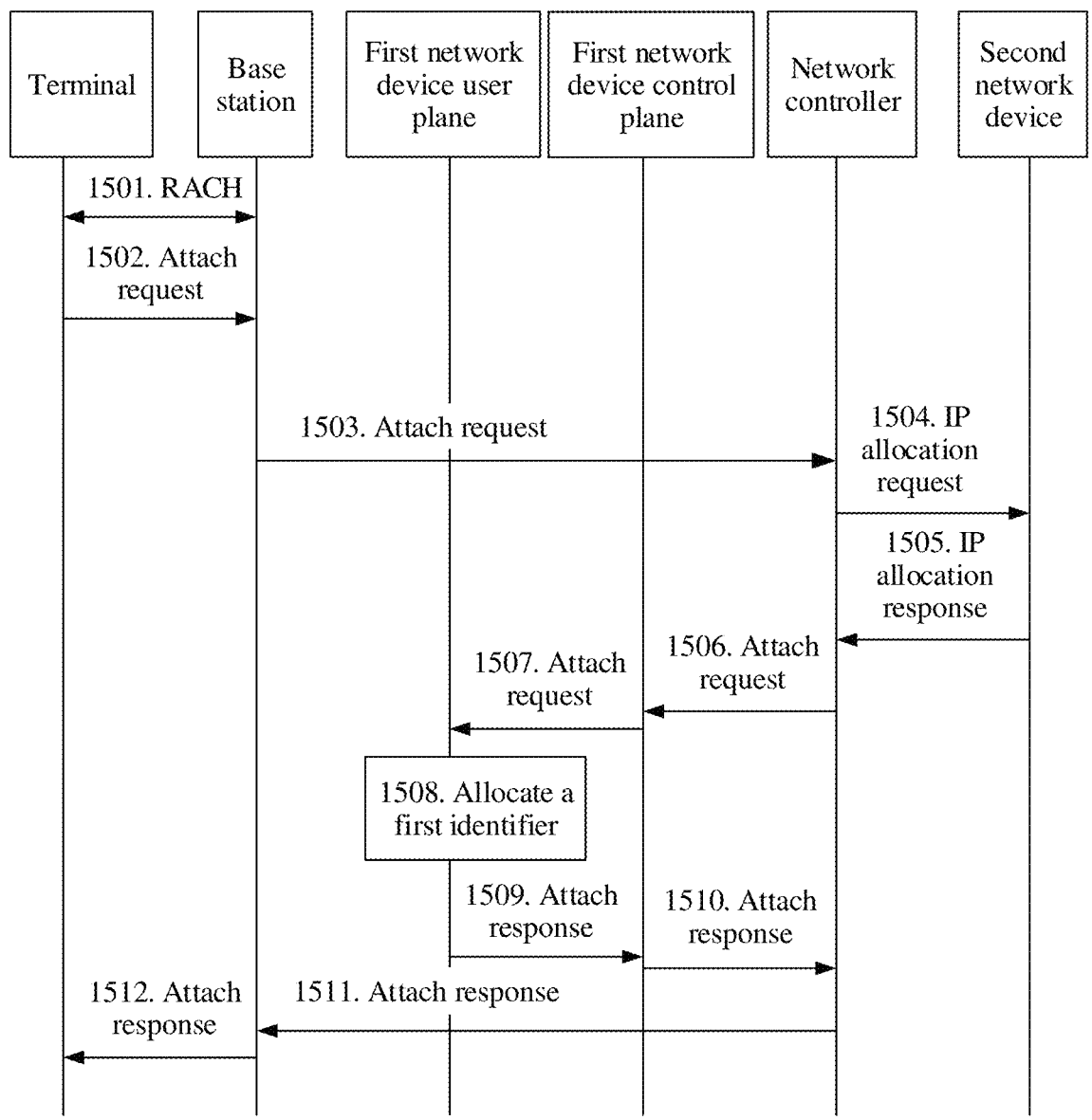

FIG. 13 to FIG. 15 are schematic flowcharts of three different embodiments in which a terminal is attached to a network in a first network device separated architecture. In the embodiments shown in FIG. 13 to FIG. 15, a first identifier of the terminal is allocated by a first network device user plane. In the embodiment shown in FIG. 13, a base station parses a message, and sends the message to a first network device control plane. In the embodiment shown in FIG. 14, a base station does not parse a message, but directly sends the message to a first network device user plane, so that the first network device user plane parses the message. If the message is a control message, the base station sends the message to a first network device control plane for processing; otherwise, the base station performs forwarding processing. In FIG. 15, a base station parses a message, and when an attach message is obtained after parsing, the base station sends the attach message to a network controller.

As shown in FIG. 13, a method in which a terminal device is attached to a network according to another embodiment of this patent application includes the following steps.

Step 1301: same as step 1101.

Step 1302: same as step 1102.

Step 1303. The base station receives the attach request, parses the attach request, and sends the attach request to a first network device control plane after parsing the attach request. The attach request may carry an ID or an IP address of the base station, and an IMSI, a MAC address, an attach type, and an encryption option that are of the terminal.

Step 1304: similar to step 1104. The first network device control plane receives the attach request, and sends an authentication request to a network controller. A message name may be a security message or an attach request. The authentication request may carry information about the base station currently serving the terminal, an ID or an IP address of the first network device control plane, and authentication information, security information, and a control policy that are of the terminal.

Step 1305: similar to step 1105. A difference is that in step 1305, an attach response is sent to the first network device control plane.

Step 1306: similar to step 1107. A difference is that in step 1306, the first network device control plane sends an IP allocation request to a corresponding gateway. The IP allocation request may carry a permanent ID of the terminal. The permanent ID may include the IMSI and the MAC address.

Step 1307: similar to step 1108. A difference is that in step 1307, the gateway sends an IP allocation response to the first network device control plane. The allocation response may carry an IP address of the gateway, the permanent ID of the terminal, the IP address allocated to the terminal, the ID or the IP address of the base station serving the terminal, and the ID or the IP address of the first network device control plane.

Step 1308: After receiving the IP allocation response, the first network device control plane selects one first network device user plane controlled by the first network device control plane, and sends an attach request to a grant-free user plane. The attach request may carry the IMSI or the MAC address of the terminal, the IP address allocated by the gateway, an authentication encryption parameter, a control policy, the ID or the IP address of the base station serving the terminal, and the like.

Step 1309: After receiving the attach request, the first network device user plane allocates a first identifier to the terminal. The first network device user plane may further set up a correspondence between the first identifier and the IP address.

Step 1310: The first network device user plane sends an attach response to the first network device control plane. The attach response may carry the IMSI or the MAC address of the terminal, the ID allocated to the terminal, and the ID or the IP address of the base station serving the terminal.

Step 1311: After receiving the attach response of the first network device user plane, the first network device control plane sends the attach response to the base station. The attach response may carry the first identifier allocated by the first network device user plane to the terminal, the IP address allocated by the gateway to the terminal, and the authentication encryption parameter.

Step 1312: same as step 1110.

As shown in FIG. 14, a method in which a terminal device is attached to a network according to another embodiment of this patent application includes the following steps.

Step 1401: same as step 1301.

Step 1402: same as step 1302.

Step 1403: The base station receives the attach request, and does not parse the attach request, but directly sends the attach request to a first network device user plane for parsing. The attach request may carry an ID or an IP address of the first network device user plane, and an IMSI, a MAC address, an attach type, and an encryption option that are of the terminal.

Step 1404: After parsing the attach request, the first network device sends the attach request to the first network device control plane. The attach request may carry an ID or an IP address of the base station, and the IMSI, the MAC address, the attach type, and the encryption option that are of the terminal.

Step 1405: similar to step 1304. The first network device control plane receives the attach request, and sends the attach request to a network controller. A message name may be a security message or an authentication request. The attach request may carry information about the base station currently serving the terminal, an ID or an IP address of the first network device control plane, and authentication information, security information, and a control policy that are of the terminal.

Step 1406: same as step 1305.
Step 1407: same as step 1306.
Step 1408: same as step 1307.
Step 1409: same as step 1308.
Step 1410: same as step 1309.
Step 1411: same as step 1310.
Step 1412: same as step 1311.
Step 1413: same as step 1312.

As shown in FIG. 15, a method in which a terminal device is attached to a network according to another embodiment of this patent application includes the following steps.

Step 1501: same as step 1301.
Step 1502: same as step 1302.
Step 1503: The base station receives the attach request, parses the attach request, and sends the attach request to a network controller after parsing. The attach request may carry an ID or an IP address of the base station, and an IMSI, a MAC address, an attach type, and an encryption option that are of the terminal.

Step 1504: same as step 1204.
Step 1505: same as step 1205.

Step 1506: After receiving the IP allocation response, the network controller sends an attach request to a first network device control plane, where the attach request may carry the ID or the IP address of the base station, the IP address allocated by the gateway to the terminal, and the IMSI, the MAC address, the attach type, and the encryption option that are of the terminal.

Step 1507: After receiving the attach request, the first network device control plane selects one first network device user plane controlled by the first network device control plane, and sends the attach request to a grant-free user plane. The attach request is the same as the attach request in step 1308.

Step 1508: same as step 1309.

Step 1509: same as step 1310.

Step 1510: After receiving the attach response, the first network device control plane sends the attach response to the network controller. The attach response may carry the first identifier allocated by the first network device user plane to the terminal and the IP address allocated by the gateway to the terminal.

Step 1511: same as step 1209.

Step 1512: same as step 1210.

In the foregoing attach process, if the base station does not parse the attach request, the attach request may be transmitted on a bearer.

Figure 16:
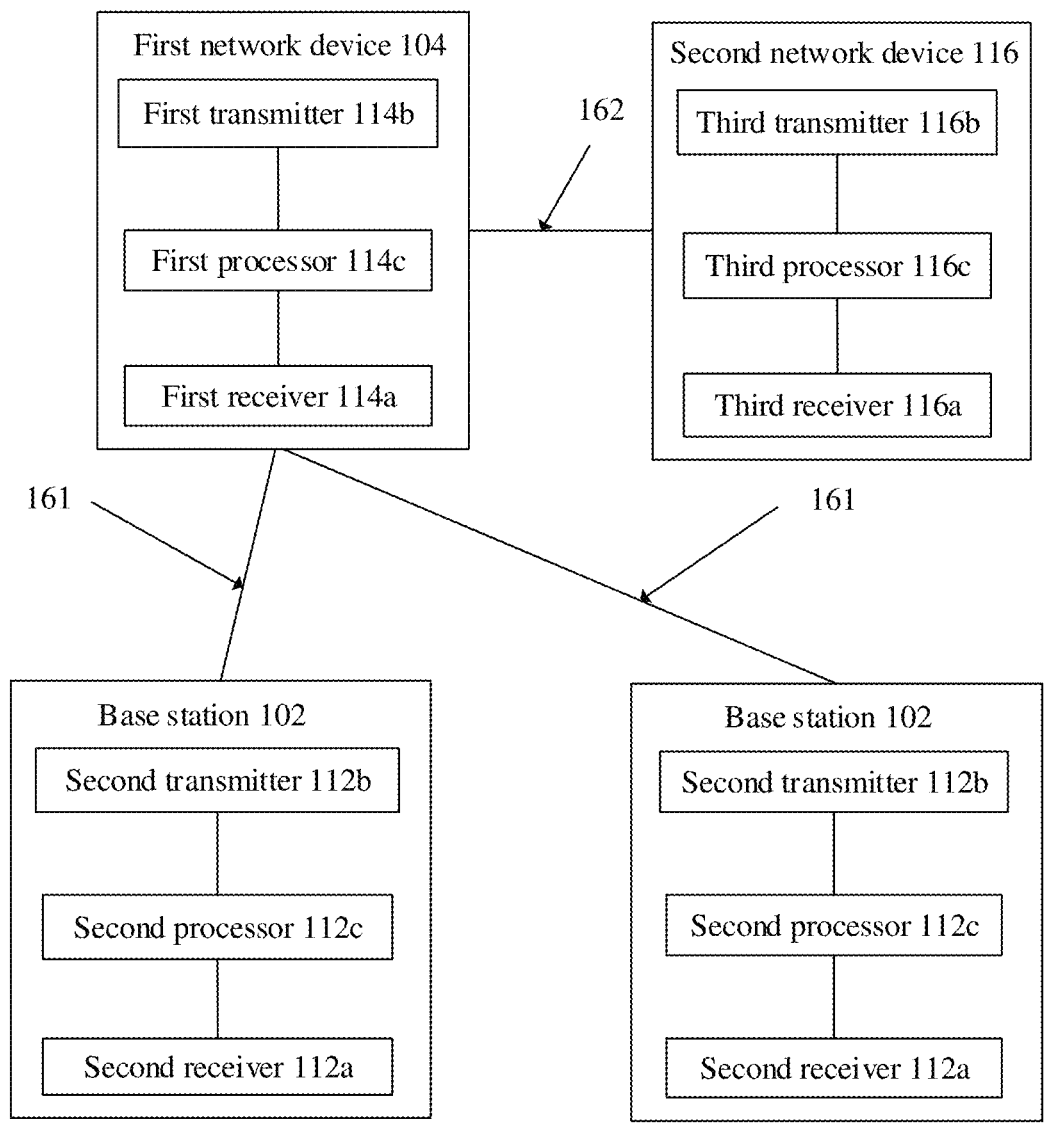
FIG. 16 is a schematic diagram of a data transmission system of a machine type according to an embodiment of this patent application.

As shown in FIG. 16, this patent application further provides a data transmission system of a machine type, including a first network device 104, a base station 102, and a second network device 106. The first network device in FIG. 16 is an integrated architecture. The data transmission system can process uplink data transmission and/or downlink data transmission.

The first network device 104 includes a first receiver 114a and a first transmitter 114b. The first network device 104 may further include a first processor 114c. The base station 102 includes a second receiver 112a and a second transmitter 112b. The base station 102 may further include a second processor 112c. The second network device 116 includes a third receiver 116a and a third transmitter 116b. The second network device 116 may further include a third processor 116c.

The second receiver 112a receives, from an air interface resource, data sent by a terminal. The second transmitter 112b sends the data to the first receiver 114a of the first network device 104 by using a pre-setup first bearer 161. When there are multiple pre-setup first bearers 161 between the base station 102 and the first network device 104, the second processor 112c may select a first bearer 161 according to a first service attribute of the data.

Optionally, the first service attribute is an attribute of an air interface resource. The second transmitter 112b sends the data by using a first bearer 161 corresponding to an attribute of the air interface resource used by the data. The first receiver 114a receives the data by using the first bearer 161.

Optionally, the first service attribute is a first service quality characteristic. The second transmitter 112b sends the data by using a first bearer 161 corresponding to a first service quality characteristic of the data. The first receiver 114a receives the data by using the first bearer 161.

Optionally, the first processor 114c may select a second bearer 162 according to a second service attribute of the data. The second service attribute may be a second service quality characteristic. The first transmitter 114b sends the data to the second network device by using a second bearer 162 corresponding to a second service quality characteristic of the data.

The data received by the first receiver 114a by using the first bearer 161 may carry a first identifier of the terminal. The data sent by the first transmitter 114b by using the second bearer 162 may carry an IP address of the terminal. There is a correspondence between the first identifier of the terminal and the IP address of the terminal. The first processor 114c may obtain the IP address of the terminal by using the first identifier of the terminal.

For the first service attribute, the second service attribute, the first bearer, the second bearer, the first identifier, and other associated technical content, refer to the foregoing description.

The data transmission system in this embodiment may further provide security control. Specific description is as follows: The first processor 114c further detects a suspected terminal according to data, and notifies the first transmitter 114b after a suspected terminal is detected. For a specific detection method, refer to some algorithms for detecting a malicious user. The first transmitter 114b may send a security request to the second receiver 112a of the base station 102 by using the first bearer 161.

The second receiver 112a notifies the second processor 112c after receiving the security request. The second processor 112c of the base station 102 performs security processing on the suspected terminal. The security processing may specifically include: blocking data of the suspected terminal or performing re-authentication on the suspected terminal on an air interface. After completing the security processing, the second processor 112c notifies the second transmitter 112b.

The second transmitter 112b sends a security response to the first receiver 114a by using the first bearer 161. The first receiver 114a receives the security response.

The first receiver 114a further receives, on the pre-setup second bearer 162, data sent by the third transmitter 116b. The data needs to be sent to a terminal in the system. When there are multiple pre-setup second bearers 162 between the second network device 116 and the first network device 104, the third processor 116c may select a second bearer 162 according to a second service attribute of the data. The second service attribute may be a second service quality characteristic.

The first transmitter 114b sends the data to the second receiver 112a of the base station 102 by using the pre-setup first bearer 161. When there are multiple pre-setup first bearers 161, the first processor 114c may select a first bearer 161 according to a first service attribute of the data. Optionally, the first service attribute is a first service quality characteristic. The first transmitter 114b sends the data by using a first bearer 161 corresponding to a first service quality characteristic of the data. The second receiver 112a receives the data by using the first bearer 161.

After the second receiver 112a receives the data, the second processor 112c may select a proper air interface resource to send the data to the base station.

Figure 17:
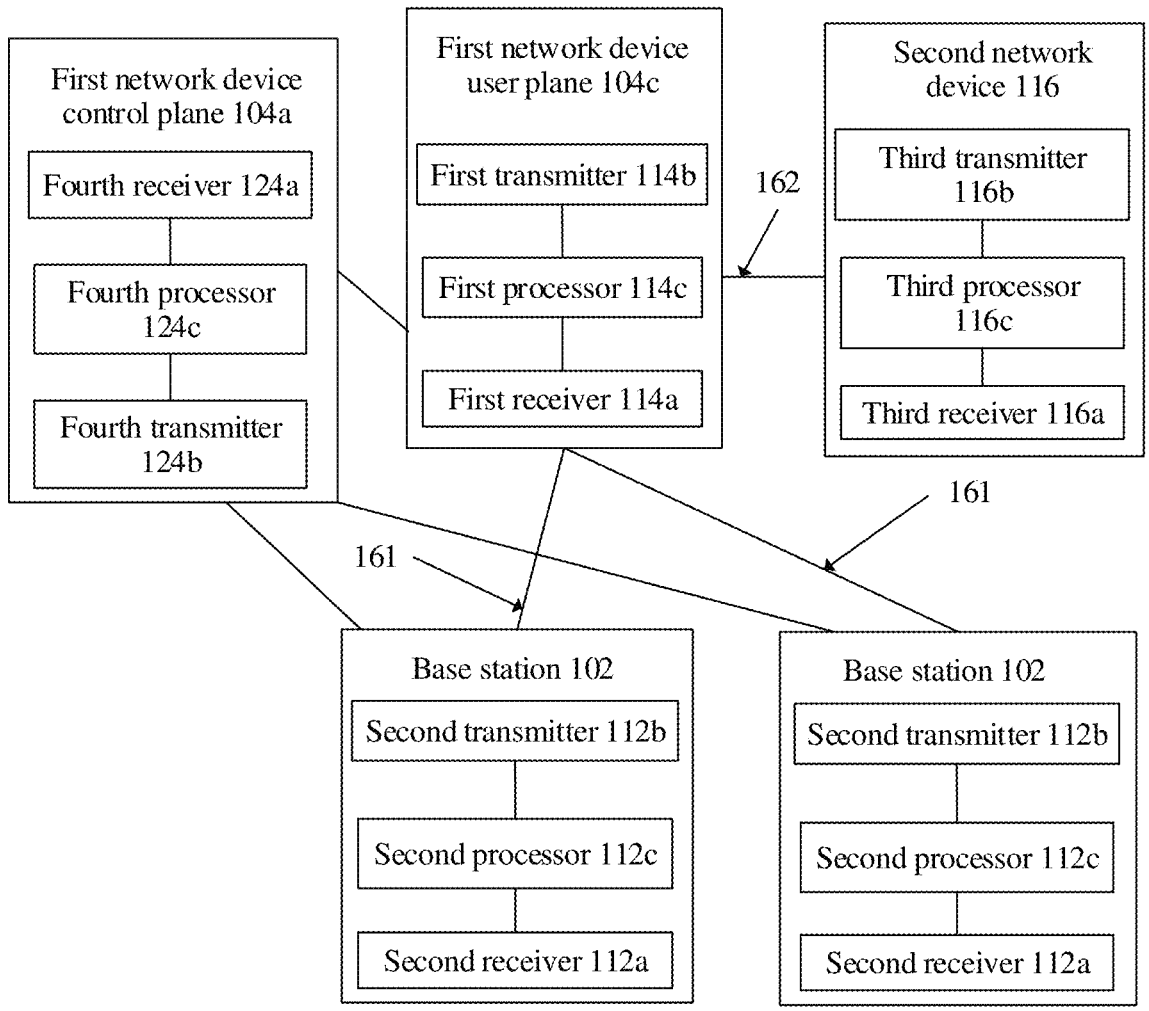
FIG. 17 is a schematic diagram of a data transmission system of a machine type according to another embodiment of this patent application.

As shown in FIG. 17, this patent application further provides a data transmission system of another machine type. Different from that in FIG. 16, a first network device in FIG. 17 is a separated architecture. A first network device 104 includes a first network device user plane 104c and a first network device control plane 104a. In terms of basic data transmission, the separated architecture is basically similar to an integrated architecture. In the separated architecture, a first receiver 114a, a first transmitter 114b, and a first processor 114c are specifically located on the first network device user plane 104c. The first network device control plane 104a includes a fourth receiver 124a, a fourth transmitter 124b, and a fourth processor 124c.

In terms of security control, this embodiment is different from the embodiment shown in FIG. 16. In this embodiment, after the first processor 114c detects a suspected terminal, the first transmitter 114b sends a security request to the fourth receiver 124a of the first network device control plane 104a. The fourth transmitter 124b sends the security request to the second receiver 112a. The second receiver 112a receives the security request. The second processor 112c takes security measures. The second transmitter 112a further sends a security response to the fourth receiver 124a of the first network device control plane 104a. The fourth receiver 124a receives the security response, and sends the security response to the first receiver 114a.

It should be understood that, to briefly and clearly describe the patent application document, a technical feature and description in one of the embodiments may be considered to be applicable to another embodiment. For example, a technical feature of a method embodiment may be applicable to an apparatus embodiment or another method embodiment, and details are not described in the another embodiment again.

In this patent application, although the steps of the method are numbered, this is only for a purpose of ease of description, and this does not indicate that each step of the method needs to be performed according to a serial number. A person skilled in the art may logically adjust a sequence of the steps of the method.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of this patent application, "B corresponding to A" indicates that B is associated with A, and B may be determined according to A. However, it should further be understood that determining A according to B does not mean that B is determined according to A only; that is, B may also be determined according to A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of this patent application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this patent application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments in this patent application.

In addition, functional units in the embodiments of this patent application may be integrated into one processing unit, or each of the units may exist alone physically, or two or more than two units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this patent application essentially, or the part contributing to the prior art, or all or a part of the technical solutions may be implemented in the form of a software product. The software product is stored in a storage medium and includes several instructions for instructing a computer device (which may be a personal computer, a server, or a first network device) to perform all or a part of the steps of the methods described in the embodiments of this patent application. The foregoing storage medium includes: any medium that can store program code, such as a USB flash drive, a removable hard disk, a read-only memory (ROM), a random access memory (RAM), a magnetic disk, or an optical disc.

With descriptions of the foregoing implementations, a person skilled in the art may clearly understand that this patent application may be implemented by hardware, firmware or a combination thereof. When this patent application is implemented by software, the foregoing functions may be stored in a computer-readable medium or transmitted as an instruction or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection may be appropriately defined as a computer-readable medium.

For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk and disc used by this patent application includes a compact disc CD, a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

The foregoing descriptions are merely specific embodiments of this patent application, but are not intended to limit the protection scope of this patent application. Any modification or replacement readily figured out by a person skilled in the art within the technical scope disclosed in this patent application shall fall within the protection scope of this patent application. Therefore, the protection scope of this patent application shall be subject to the protection scope of the claims.

In summary, what is described above is merely example embodiments of the technical solutions of this patent application, but is not intended to limit the protection scope of this patent application. Any modification, equivalent replacement, or improvement made without departing from the spirit and principle of this patent application shall fall within the protection scope of this patent application.

What is claimed is:

1. A data transmission method, comprising:
   receiving, by a first network device by using a first bearer, data from a base station, wherein the base station receives the data from a terminal, wherein the data carries a first identifier of the terminal, wherein the first bearer used to receive the data by the first network device from the base station corresponds to a first service attribute of the data, wherein one or more first bearers are disposed between the first network device and the base station, and wherein one or more second bearers are disposed between the first network device and a second network device;
   obtaining, by the first network device, an IP address of the terminal according to a correspondence between the first identifier of the terminal and the IP address of the terminal; and
   sending, by the first network device, the data to the second network device by using a second bearer, wherein the second bearer used to send the data to the second network device corresponds to a second service attribute of the data, and the data sent by the first network device to the second network device carries the IP address of the terminal.

2. The method according to claim 1, wherein the first bearer is set up when the base station is initialized.

3. The method according to claim 1, wherein the first bearer is set up when the first network device is initialized.

4. The method according to claim 1, wherein the second bearer is set up when the base station is initialized.

5. The method according to claim 1, wherein the second bearer is set up when the first network device is initialized.

6. The method according to claim 1, wherein the second network device is a server, and the second bearer is set up when the server is initialized.

7. The method according to claim 1, wherein the first service attribute of the data is an attribute of an air interface resource, and the first bearer used to receive the data corresponds to the attribute of the air interface resource.

8. The method according to claim 1, wherein the first service attribute of the data is a first service quality characteristic of the data, and the first bearer used to receive the data corresponds to a first service quality characteristic of the data.

9. The method according to claim 1, wherein the second service attribute of the data is a second service quality characteristic of the data, and the method further comprises:
   determining, by the first network device based on the second service quality characteristic of the data, the second bearer used to send the data to the second network device.

10. The method according to claim 1, wherein a bit quantity of the first identifier is less than a bit quantity of the IP address.

11. The method according to claim 1, wherein the data is sent from the terminal to the base station by using an air interface resource.

12. A first network device, comprising:
   a first processor;
   a first receiver; and
   a first transmitter;
   wherein one or more first bearers are disposed between the first network device and a base station;
   wherein one or more second bearers are disposed between the first network device and a second network device;
   wherein the first receiver receives, using a first bearer from the one or more first bearers, data from the base station, wherein the base station receives the data from a terminal, wherein the data carries a first identifier of the terminal, and wherein the first bearer used to receive the data by the first network device from the base station corresponds to a first service attribute of the data;
   wherein the first processor obtains an IP address of the terminal according to a correspondence between the first identifier of the terminal and the IP address of the terminal; and
   wherein the first transmitter sends the data to the second network device using a second bearer from the one or more second bearers, wherein the second bearer used to send the data to the second network device corresponds to a second service attribute of the data, and the data sent by the first transmitter to the second network device carries the IP address of the terminal.

13. The first network device according to claim 12, wherein the first bearer and the second bearer are set up when the first network device is initialized.

14. The first network device according to claim 12, wherein the first service attribute of the data is an attribute of an air interface resource, and the first bearer used to receive the data corresponds to the attribute of the air interface resource.

15. The first network device according to claim 12, wherein the first service attribute of the data is a first service quality characteristic of the data, and the first bearer used to receive the data corresponds to the first service quality characteristic of the data.

16. The first network device according to claim 12, wherein the second service attribute of the data is a second service quality characteristic of the data; and wherein the first processor determines based on the second service quality characteristic of the data, the second bearer used to send the data to the second network device.

17. The first network device according to claim 12, wherein a bit quantity of the first identifier is less than a bit quantity of the IP address.

18. The first network device according to claim 12, wherein the data is sent from the terminal to the base station by using an air interface resource.

* * * * *